(12) United States Patent
Giannios et al.

(10) Patent No.: US 12,548,285 B2
(45) Date of Patent: Feb. 10, 2026

(54) IMAGE TEXTURE MANIPULATION FOR MACHINE LEARNING DATA AUGMENTATION

(71) Applicant: Micron Technology, Inc., Boise, ID (US)

(72) Inventors: Katya Giannios, West Lafayette, IN (US); Bambi Delarosa, Celina, TX (US); Abhishek Chaurasia, Redmond, WA (US)

(73) Assignee: Micron Technology, Inc., Boise, ID (US)

( * ) Notice: Subject to any disclaimer, the term of this patent is extended or adjusted under 35 U.S.C. 154(b) by 271 days.

(21) Appl. No.: 18/512,715

(22) Filed: Nov. 17, 2023

(65) Prior Publication Data

US 2024/0169688 A1     May 23, 2024

Related U.S. Application Data

(60) Provisional application No. 63/384,683, filed on Nov. 22, 2022.

(51) Int. Cl.

| | | |
|---|---|---|
| *G06T 5/00* | (2024.01) | |
| *G06T 5/10* | (2006.01) | |
| *G06T 5/70* | (2024.01) | |
| *G06T 7/50* | (2017.01) | |
| *G06V 10/42* | (2022.01) | |
| *G06V 10/54* | (2022.01) | |

(52) U.S. Cl.
CPC ............ *G06V 10/431* (2022.01); *G06T 5/10* (2013.01); *G06T 5/70* (2024.01); *G06T 7/50* (2017.01); *G06V 10/54* (2022.01); *G06T 2207/10024* (2013.01); *G06T 2207/20052* (2013.01)

(58) Field of Classification Search
CPC .... G06V 10/431; G06V 10/54; G06V 10/774; G06V 10/764; G06T 5/10; G06T 5/70; G06T 7/50; G06T 2207/10024; G06T 2207/20052; G06T 7/42; G06N 20/00
See application file for complete search history.

(56) References Cited

U.S. PATENT DOCUMENTS

2018/0068634 A1\* 3/2018 Yoo ........................... G06T 5/70

\* cited by examiner

*Primary Examiner* — Kent Yip
(74) *Attorney, Agent, or Firm* — Harrity & Harrity, LLP

(57) ABSTRACT

Implementations described herein relate to image texture manipulation for machine learning data augmentation. In some implementations, a computer vision platform may transform first data of a first image file to a first frequency domain representation of the first image file. The computer vision platform may identify, based on the first frequency domain representation, a first subset of frequencies for the first image file. The computer vision platform may transform second data of a second image file to a second frequency domain representation of the second image file. The computer vision platform may identify, based on the second frequency domain representation, a second subset of frequencies for the second image file. The computer vision platform may generate a third image file based on the first subset of frequencies and the second subset of frequencies. The computer vision platform may store the third image file in a set of image files.

20 Claims, 20 Drawing Sheets

IMAGE TEXTURE MANIPULATION FOR MACHINE LEARNING DATA AUGMENTATION

CROSS-REFERENCE TO RELATED APPLICATION

This Patent Application claims priority to U.S. Provisional Patent Application No. 63/384,683, filed on Nov. 22, 2022, entitled "IMAGE TEXTURE MANIPULATION FOR MACHINE LEARNING DATA AUGMENTATION," and assigned to the assignee hereof. The disclosure of the prior Application is considered part of and is incorporated by reference into this Patent Application.

TECHNICAL FIELD

The present disclosure generally relates to machine learning and, for example, image texture manipulation for machine learning data augmentation.

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

DETAILED DESCRIPTION

Figure 1A:
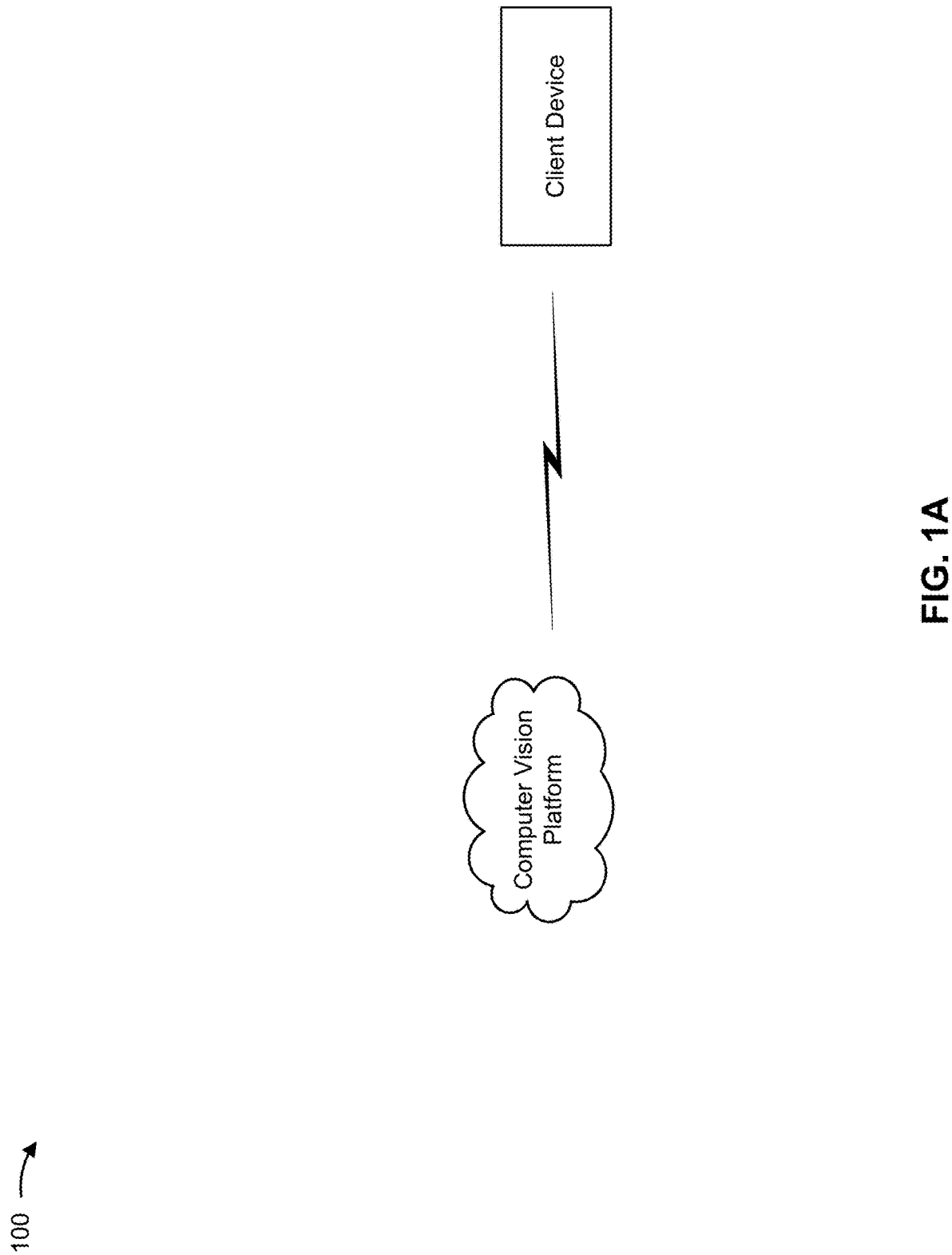
FIGS. 1A-1F are diagrams of an example implementation of image texture manipulation for machine learning data augmentation.

Machine learning based data processing can be used to achieve significant data processing improvements in numerous areas, such as computer vision, natural language processing, biology, and/or healthcare, among other examples. Constructing a machine learning model that can learn general and predictive knowledge from training data, and then applying the machine learning model to large data sets (referred to as test data) to achieve accurate predictions or inferences is one of the primary goals of any machine learning model. However, when probability distributions of training data and testing data are different, or when the training data comes from multiple sources, a machine learning model may undergo a dramatic performance drop due to domain bias and shift, among other examples. Collecting and training on data from all possible domains may not be cost effective or feasible.

The inability to train a machine learning model on training data from many different domains may result in reduced accuracy of the machine learning model in predicting outcomes or inferring properties from large data sets and may increase consumption of processing and memory resources of a computing device that uses the machine learning model. For example, additional processing and memory resources may be consumed in modifying the machine learning model and retraining the machine learning model to produce increased accuracy in predicting outcomes or inferring properties from large data sets. As another example, additional processing and memory resources may be consumed in testing the machine learning model on additional test data after modifying the machine learning model and retraining the machine learning model to produce increased accuracy in predicting outcomes or inferring properties from large data sets.

Some implementations described herein provide image texture manipulation techniques in which a computer vision platform (or another type of platform that uses a machine learning model) may achieve data generalization through the use of modifying the texture of image files in a data set to augment the data set. The data set can then be used to train and/or test a machine learning model to identify objects in an image file, to identify features or properties of an object in an image file, to classify image files in a data set, and/or to perform other machine learning based data processing techniques.

The image texture manipulation techniques described herein may include the computer vision platform modifying the textures of image files included in a data set to generalize the textures across the image files of the data set. In other words, the computer vision platform may analyze the properties of the image files to determine the specific texture properties of the image files, and may then modify the image files such that the textures of the image files are more consistent and similar across the data set.

The image texture manipulation techniques described herein may enable the computer vision platform to train a machine learning model on large data sets from different domains and/or sources, which enables the accuracy of the machine learning model to be increased. Moreover, the image texture manipulation techniques described herein may enable the computer vision platform to more accurately predict outcomes, infer properties, and/or generate other outputs using a machine learning model in a manner in which consumption of processing and memory resources are reduced. In particular, the consumption of processing and memory resources of the computer vision platform may be reduced through the use of the image texture manipulation techniques described herein in that the computer vision platform may need to modify and retrain the machine learning model fewer times than if the image texture manipulation techniques described herein were not used. The reduced quantity of time modifying and retraining the machine learning model reduces the consumption of processing and memory resources that would otherwise be wasted on modifying and retraining the machine learning model.

FIGS. 1A-1F are diagrams of an example implementation 100 of image texture manipulation for machine learning data augmentation. As shown in FIG. 1A, the example implementation 100 includes a computer vision platform and a client device. These devices are described in more detail below in connection with FIG. 4 and FIG. 5. As further shown in FIG. 1A, the client device and the computer vision platform may communicate to exchange information related to image texture manipulation for machine learning data augmentation. The client device and the computer vision platform may communicate via a wired network, a wireless network, and/or a direct communication connection.

The computer vision platform may include one or more devices that are configured to use a machine learning model to process large data sets. The large data sets may include tens of thousands, hundreds of thousands, and even millions of electronic files. The electronic files may include image files, data files, video files, and/or another type of electronic files. The computer vision platform may be configured to use the machine learning model to perform computer vision operations such as object recognition in an image file, image file classification, object classification, pattern recognition across a set of image files, and/or image file tagging, among other examples. The machine learning model may include a classifier model (e.g., a logistic regression model, a Naïve Bayes model, a K-nearest neighbors model, a decision tree model), a neural network model (e.g., a deep learning neural network model, a convolutional neural network model), and/or another type of machine learning model.

The computer vision platform may train the machine learning model using training data (e.g., historical data). The training data may include a set of image files (e.g., tens of thousands of image files, hundreds of thousands image files, and even millions of image files). After training, the computer vision platform may test the machine learning model using test data. The test data may include a set of image files (e.g., tens of thousands of image files, hundreds of thousands image files, and even millions of image files).

The computer vision platform may achieve data generalization of a data set (e.g., a training data set, a test data set) that includes a set of image files. In particular, the computer vision platform may modify the texture of the image files in the set of image files. The computer vision platform may use image texture manipulation techniques to generalize the textures across the image files of the set of images. In other words, the computer vision platform may analyze the properties of the image files to determine the specific texture properties of the image files, and may then modify the image files such that the textures of the image files are more consistent and similar across the set of images.

The "texture" of an image file, as used herein, may refer to non-structural properties and/or non-shape properties of objects in an image file. Texture can include the fur of an animal displayed in an image file, the background of an image file (e.g., grass, a sky gradient, digital artifacts and distortion), and/or a design or pattern on an object in an image file, among other examples. The "structure" of an image file, as used herein, may refer to non-textural elements in an image file, and instead may refer to objects that are displayed in the image file. For example, the structure of an image file may include the shapes and contours of an object in the image file.

In some cases, large differences in textures of two or more image files may result in the machine learning model placing too much emphasis on the textures of the image files. This can result in the machine learning model placing less emphasis on the non-textural properties of the images files, such as the structural elements and shapes displayed in the image files. This can result in erroneous classifications, inaccurate object identifications, and/or other image recognition issues. By modifying the image files such that the textures of the image files are more consistent and similar across the set of images, the computer vision platform can cause the machine learning model to deemphasize the textures in the image files and place more focus and emphasis on analyzing the differences in shapes and structures in the image files. In this way, the classification and/or pattern recognition performance of the machine learning model may be increased, and data sets of images files from different domains and/or sources may be used to train and/or test the machine learning model.

Figure 1B:
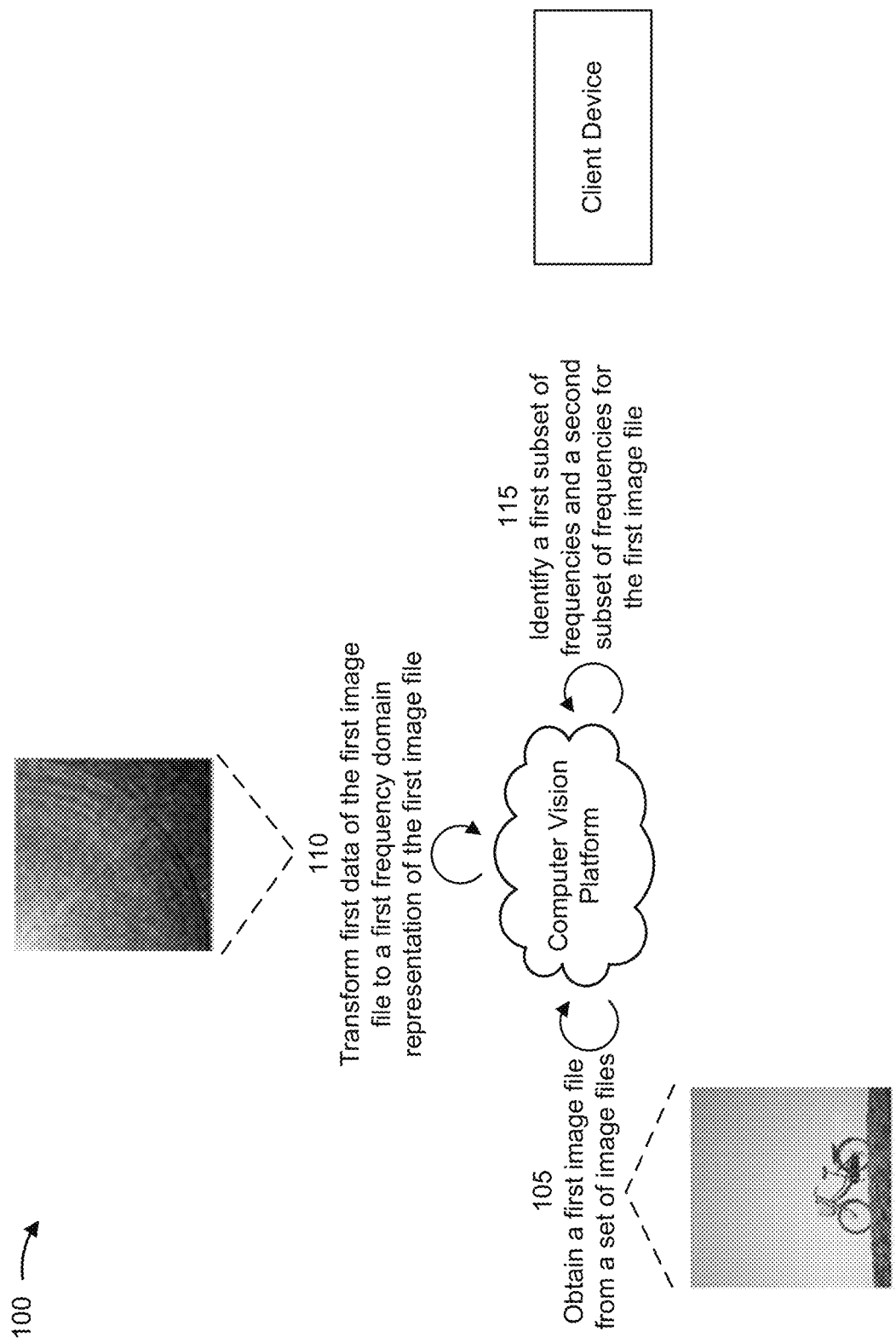

At 105 in FIG. 1B, the computer vision platform may obtain a first image file from a set of image files (e.g., a set of training image files, a set of test image files). The computer vision platform may obtain the first image file from a data structure in which the set of image files is stored. The data structure may include a memory device, a storage device, a database, a file system, and/or another type of data structure. The data structure may be included in the computer vision platform, may be remote from the computer vision platform, or a combination thereof.

At 110 in FIG. 1B, the computer vision platform may transform the first data of the first image file to a first frequency domain representation of the first image file. The computer vision platform may transform the first data of the first image file to the first frequency domain representation of the first image file to enable manipulation of texture-specific frequencies of the first image file. The first frequency domain representation of the first image file may include a representation of the spatial information of the first image file as a sum of sinusoids of varying magnitudes and frequencies using real numbers. The sinusoids may be indexed from sinusoids having low-frequency components (corresponding to portions of the first image file having mostly constant spatial patterns) to sinusoids having high-frequency components (corresponding to portions of the first image file having highly detailed spatial patterns).

The computer vision platform may apply a discrete cosine transform (DCT) to transform the first data of the first image file to the first frequency domain representation of the first image file. The DCT is a type of Fourier-related transform that represents an image file as a sum of sinusoids of varying magnitudes and frequencies using real numbers. The use of the DCT enables the computer vision platform to confine the visually significant information of the texture of the first image file in a small quantity of coefficients of the DCT. This enables the computer vision platform to more easily identify the frequencies of the first image file that most affect the texture of the image file. The DCT may be two dimensional in that the computer vision platform may apply the DCT to the first image file to generate an M×N matrix that represents the frequency distribution of the first image file. The M×N matrix may correspond to the first frequency domain representation of the first image file.

At 115 in FIG. 1B, the computer vision platform may identify one or more subsets of frequencies for the first image file based on the first frequency domain representation of the first image file (e.g., based on the M×N matrix that represents the first frequency distribution of the first image file). For example, the computer vision platform may identify a first subset of frequencies for the first image file based on the first frequency domain representation of the first image file. As another example, the computer vision platform may identify a second subset of frequencies for the first image file based on the first frequency domain representation of the first image file. In some implementations, the computer vision platform may identify the first subset of frequencies for the first image file and may process the first image file based on the first subset of frequencies prior to identifying the second subset of frequencies. In some implementations, computer vision platform concurrently identifies the first subset of frequencies and the second subset of frequencies. In some implementations, each subset of frequencies may be randomly selected below or above a frequency threshold, and the quantities of frequencies in each portion may also be random.

In some implementations, the first subset of frequencies and the second subset of frequencies are non-overlapping subsets of frequencies. In other words, the frequencies included in the first subset of frequencies are not included in the second subset of frequencies, and the frequencies included in the second subset of frequencies are not included in the first subset of frequencies. In some implementations, the first subset of frequencies and the second subset of frequencies are at least partially overlapping subsets of frequencies. In other words, one or more frequencies may be included in the first subset of frequencies and in the second subset of frequencies.

The first subset of frequencies may be a "low" frequency list, and the second subset of frequencies may be a "high" frequency list. The first subset of frequencies may include frequencies of the first image file that are included in a range of greater than $0^{th}$ of an image size of the first image file and approximately $\frac{1}{100}^{th}$ of the image size of the first image file. The second subset of frequencies may include frequencies of the first image file that are included in a range of approximately $\frac{2}{3}^{rd}$ of an image size of the first image file and less than the image size of the first image file. However, other values for these ranges are within the scope of the present disclosure.

In some implementations, the first image file may include a grayscale image. In these implementations, the computer vision platform may transform grayscale data of the first image file to a grayscale frequency domain representation of the first image file, and may identify one or more subsets of frequencies based on the grayscale frequency domain representation of the first image file.

In some implementations, the first image file may include a color image file having a plurality of color channels (e.g., red, green, and blue (RGB) color channels; cyan, magenta, and yellow with key (CMYK) color channels). In these implementations, the computer vision platform may transform each of the color channels of the first image file to respective frequency domain representations for each of the color channels. For example, the computer vision platform may transform red channel data of the first image file to a red channel frequency domain representation of the first image file, may transform green channel data of the first image file to a green channel frequency domain representation of the first image file, and may transform blue channel data of the first image file to a blue channel frequency domain representation of the first image file. Here, the computer vision platform may identify, based on the red channel frequency domain representation, a first subset of red frequencies and a second set of red frequencies for the first image file; may identify, based on the green channel frequency domain representation, a first subset of green frequencies and a second subset of green frequencies for the first image file; and/or may identify, based on the blue channel frequency domain representation, a first subset of blue frequencies and a second subset of blue frequencies for the first image file.

Figure 1C:
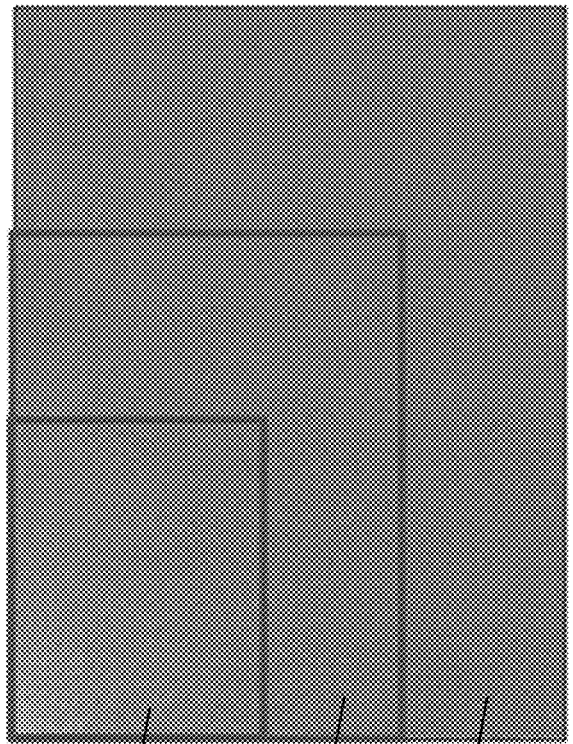

FIG. 1C illustrates an example M×N matrix for the first image file. The M×N matrix may correspond to the first frequency domain representation of the first image file. As shown in FIG. 1C, the M×N matrix may group frequency ranges of the first image file into low frequencies, middle (mid) frequencies, and high frequencies. The first subset of frequencies may correspond to the low frequencies in the M×N matrix, and the second subset of frequencies may correspond to the high frequencies in the M×N matrix. The low frequencies and the high frequencies may represent and/or may correspond to the texture properties of the first image file, whereas the middle frequencies may represent and/or may correspond to the structural properties (e.g., the shapes, contours, and/or edges of objects) in the first image file. Thus, identifying the first subset of frequencies and the second subset of frequencies to include the textural properties of the first image file enables the computer vision platform to isolate the textural properties of the first image file for manipulation and/or modification, while leaving the structural properties of the first image file intact and unmodified.

Figure 1D:
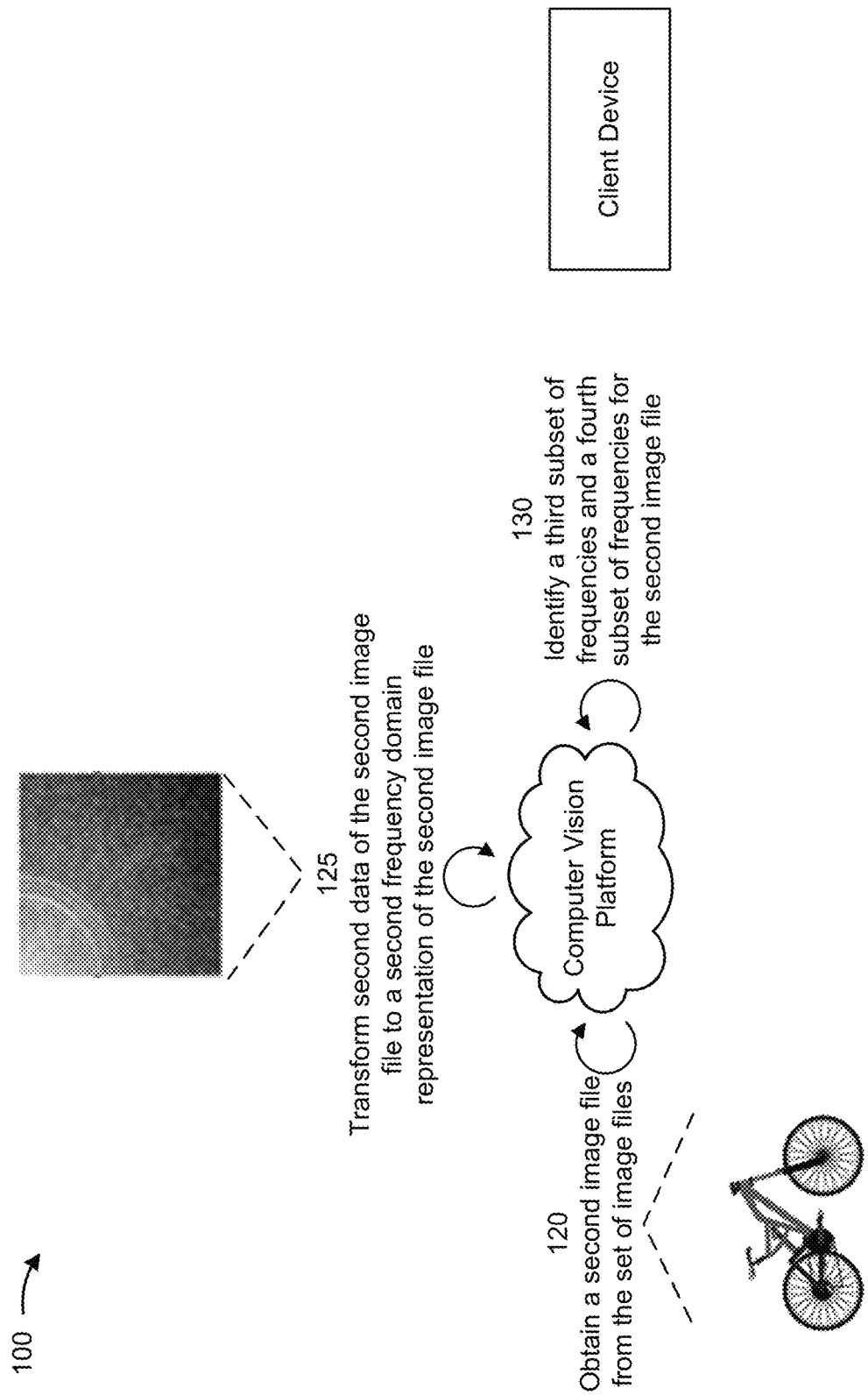

As shown in FIG. 1D, at 120, 125, and 130, the computer vision platform may perform similar operations as described in connection with 105, 110, and 115, respectively, in FIG. 1B for a second image file included in the set of images. For example, the computer vision platform may obtain the second image file from the set of image files at 120, may transform second data of the second image file to a second frequency domain representation of the second image file at 125, and may identify a third subset of frequencies and a fourth subset of frequencies for the second image file at 130 based on the second frequency domain representation.

In some implementations, prior to performing the operations in connection with 125 and 130, the computer vision platform may resize the second image file such that the size of the second image file is the same as, or substantially similar to, the first image file. For example, the computer vision platform may reduce or increase the vertical pixel count of the second image file to be the same as, or substantially similar to, the vertical pixel count of first image file. As another example, the computer vision platform may reduce or increase the horizontal pixel count of the second image file to be the same as, or substantially similar to, the horizontal pixel count of first image file.

It is to be noted that, in some implementations, a "blank" image may be used as the second image file. In these implementations, the second image file includes an image having a single color and no objects in the image. For example, a "blank" image may be a white color image, a black color image, or another type of image with a single color. In this way, when a "blank" image is used as the second image file, the complete lack of texture in the second image file functions as an erasure of the textural information from the first image file.

Figure 1E:
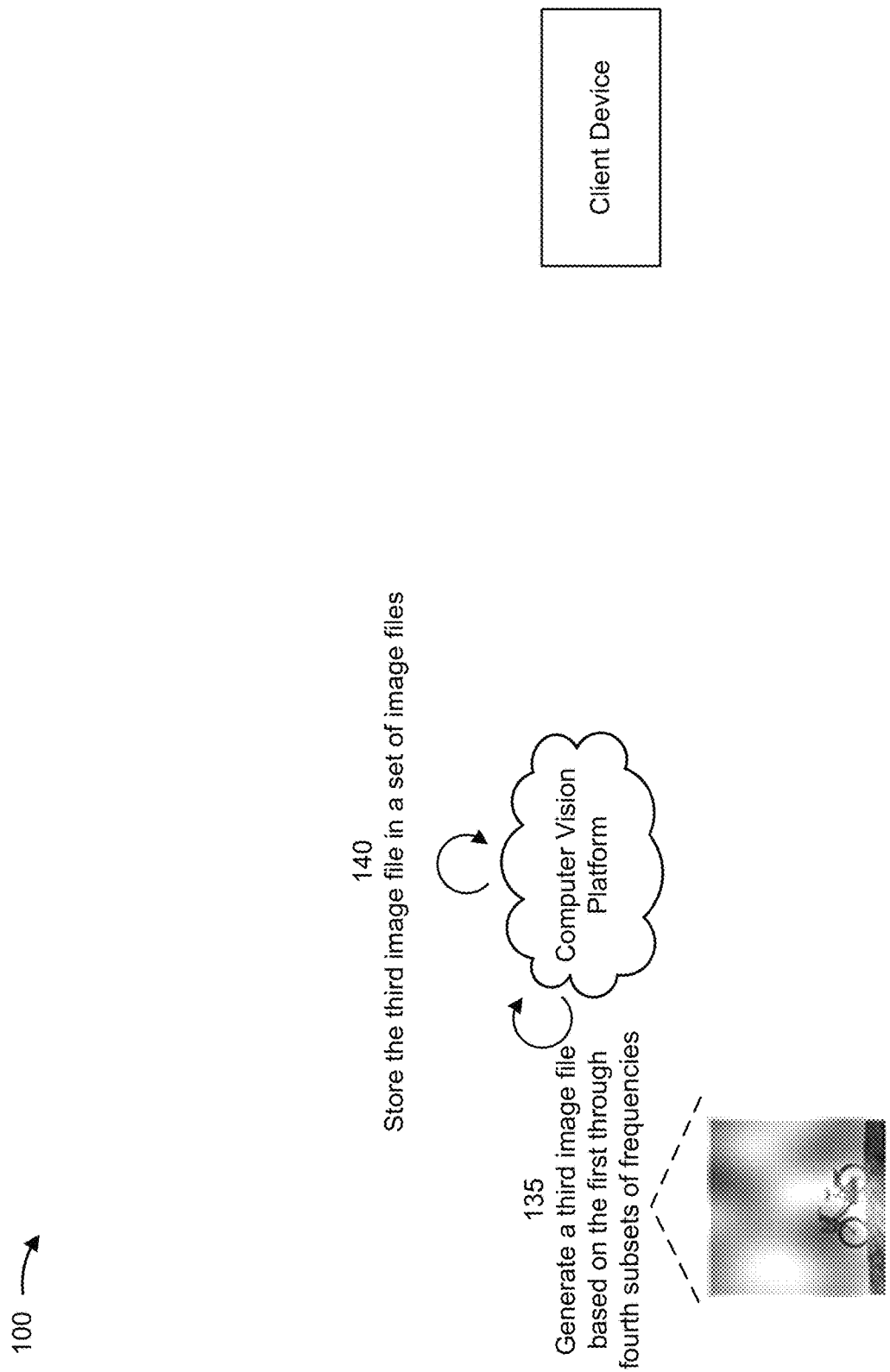

At 135 in FIG. 1E, the computer vision platform may generate a third image file based on the first subset of frequencies and the second subset of frequencies of the first image file, and based on the third subset of frequencies and the fourth subset of frequencies of the second image file. The third image file may correspond to a modified (or texture-manipulated) version of the first image file.

To generate the third image file, the computer vision platform may mix frequencies corresponding to texture in the first image file with frequencies corresponding to texture in the second image file. For example, at least a portion of the first subset of frequencies may be replaced with at least a portion of the third subset of frequencies, and at least a portion of the second subset of frequencies may be replaced with at least a portion of the fourth subset of frequencies. This results in mixing of texture properties of the first image file and texture properties of the second image file in the third image file. In this way, the third image file may include a combination of portions of texture of the first image file and portions of texture of the second image file. This enables the texture properties of the first image file and of the second image file to be generalized across a set of image files. In some implementations, each portion of the first through fourth subsets of frequencies are randomly selected and the quantities of frequencies in each portion may also be random.

To mix the frequencies corresponding to texture in the first image file with frequencies corresponding to texture in the second image file, the computer vision platform may perform a band pass swap of portions of subsets of frequencies between the first image file and the second image file. For example, the computer vision platform may perform a band pass swap to replace the first subset of frequencies in the first image file with the third subset of frequencies in the second image file. As another example, the computer vision platform may perform a band pass swap to replace the second subset of frequencies in the first image file with the fourth subset of frequencies in the second image file.

To perform the band pass swap, the computer vision platform may generate a selection band mask based on the first subset of frequencies and the third subset of frequencies. The computer vision platform may generate the selection band mask such that the selection band mask has a quarter circle shape with an origin at coordinates (0,0). The quarter circle shape may conform to the frequency banding in the M×N matrix of the first image file and may conform to the frequency banding in the M×N matrix of the first image file. The computer vision platform may generate the selection band mask such that the selection band mask has a radius (e.g., such that the quarter circle shape has a radius) that is based on the first subset of frequencies. For example, the radius may correspond to the radius or radius range of the first subset of frequencies in the M×N matrix of the first image file. The computer vision platform may generate the selection band mask such that the quarter circle shape of the selection band mask has a particular border thickness (e.g., 1 pixel, 2 pixels, 4 pixels).

The computer vision platform may apply a Gaussian blur to the selection band mask. The Gaussian blur may have a particular kernel size, such as a kernel size of 5, among other examples. The computer vision platform may multiply, after applying the Gaussian blur to the selection band mask, the selection band mask with the second subset of frequencies. The computer vision platform may perform a similar set of operations to apply the band pass swap to swap the portion of the second subset of frequencies with the portion of the fourth subset of frequencies.

At 140 in FIG. 1E, the computer vision platform stores the third image file in a set of image files. The computer vision platform may store the set of image files in a data structure. The data structure may include a memory device, a storage device, a database, a file system, and/or another type of data structure. The data structure may be included in the computer vision platform, may be remote from the computer vision platform, or a combination thereof.

The set of image files may include the same set of image files from which the first image file and the second image file were obtained. In these implementations, the set of image files includes the original image files along with image files that are generated by modifying the original image files. Alternatively, the set of image files may be a newly generated set of image files that only includes image files that are generated by modifying the original image files in the original set of image files. Thus, the newly generated set of image files is a generalized data set that can be used to train and/or test a machine learning model.

In some implementations, the computer vision platform may perform a similar set of operations described in connection with reference number 135 to generate a fourth image file that corresponds to a modified (or texture-manipulated) second image file. The computer vision system may store the fourth image file in the set of image files in a similar manner as described in connection with reference number 140 for the third image file.

In some implementations, the computer vision platform performs the operations described in connection with reference numbers 105-140 for a plurality of image files to generalize the texture properties of image files in a set of image files that may be used to train and/or test a machine learning model. Here, the computer vision platform performs the operations described in connection with reference numbers 105-140 for hundreds of image files, thousands of image files, tens of thousands of image files, hundreds of thousands of image files, and/or millions of image files, among other examples. This enables the computer vision platform to generate a large data set of generalized image files that may be used to train and/or test the machine learning model.

In some implementations, the computer vision platform performs the operations described in connection with reference numbers 105-140 for modified image files (e.g., image files that were generated by performing the operations described in connection with reference numbers 105-140). In some implementations, the computer vision platform performs the operations described in connection with reference numbers 105-140 for a quantity of cycles on image files included in a set of image files until the computer vision platform determines that one or more texture properties of the image files included in the set of image files satisfies one or more associated thresholds. In this way, the computer vision platform may perform texture mixing using the techniques described in connection with reference numbers 105-140 to achieve a threshold level texture generalization across the image files in the set of image files. The computer vision platform may determine the texture properties of the image files using one or more techniques described in connection with FIGS. 2A-2C.

Figure 1F:
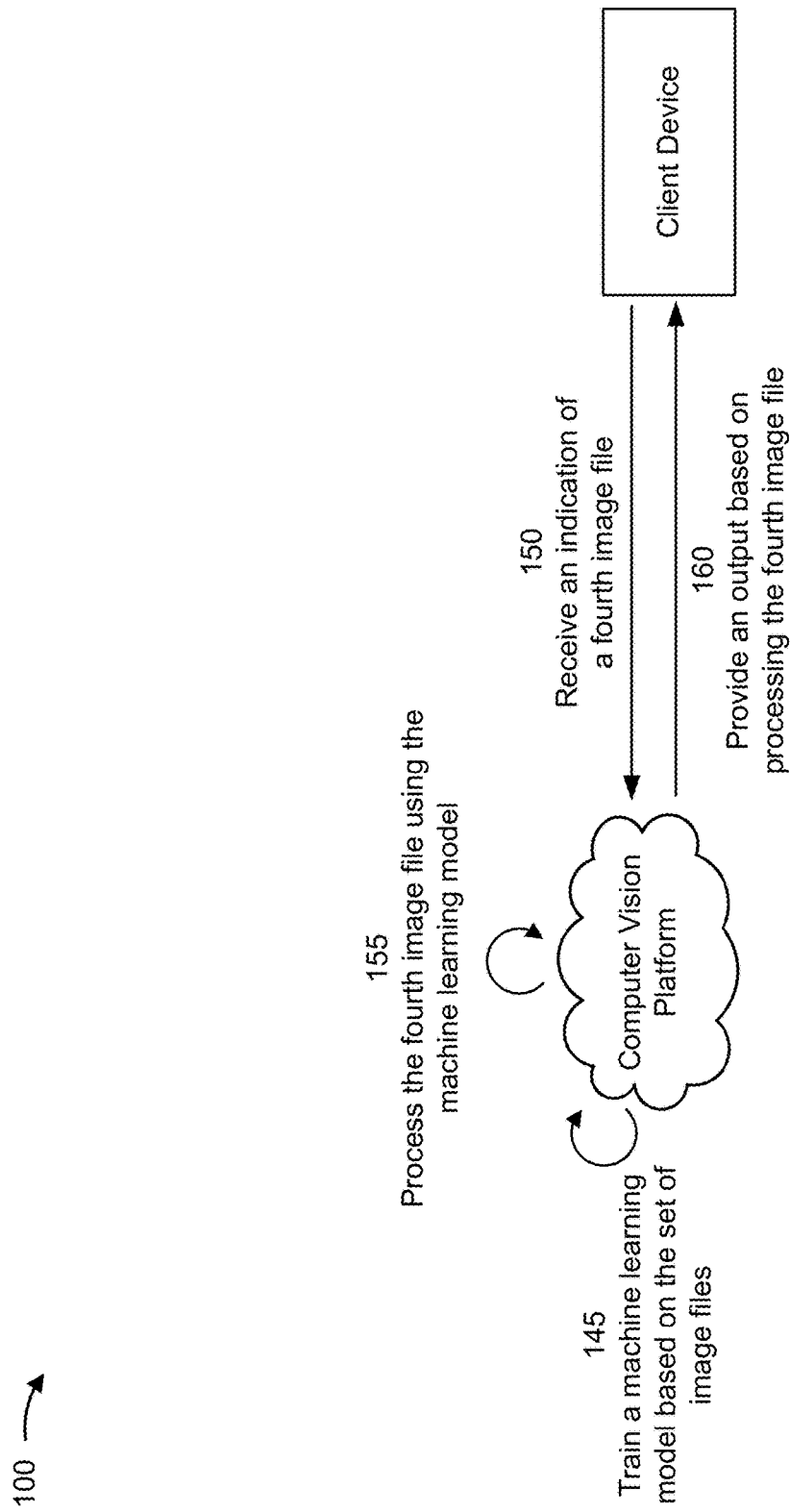

At 145 in FIG. 1F, the computer vision platform may use the set of image files (e.g., the set of image files that includes the generated image files) to train a machine learning model based on the set of image files. Subsequently, at 150 in FIG. 1F, the computer vision platform may receive (e.g., from the client device) an indication of a fourth image file and, at 155 in FIG. 1F, the computer vision platform may process the fourth image file using the machine learning model that was trained on the set of image files. The computer vision platform may use the machine learning model to identify one or more objects in the fourth image file, to classify the one or more objects, to classify the fourth image file, and/or to perform another computer vision operation using the machine learning model. At 160 in FIG. 1F, the computer vision platform may provide an output to the client device based on processing the fourth image. The output may include an indication of the one or more objects identified in the fourth image file, an indication of a classification of the fourth image file, an indication of a classification of the one or more objects, and/or another type of output.

As indicated above, FIGS. 1A-1F are provided as an example. Other examples may differ from what is described with regard to FIGS. 1A-1F.

Figure 2A:
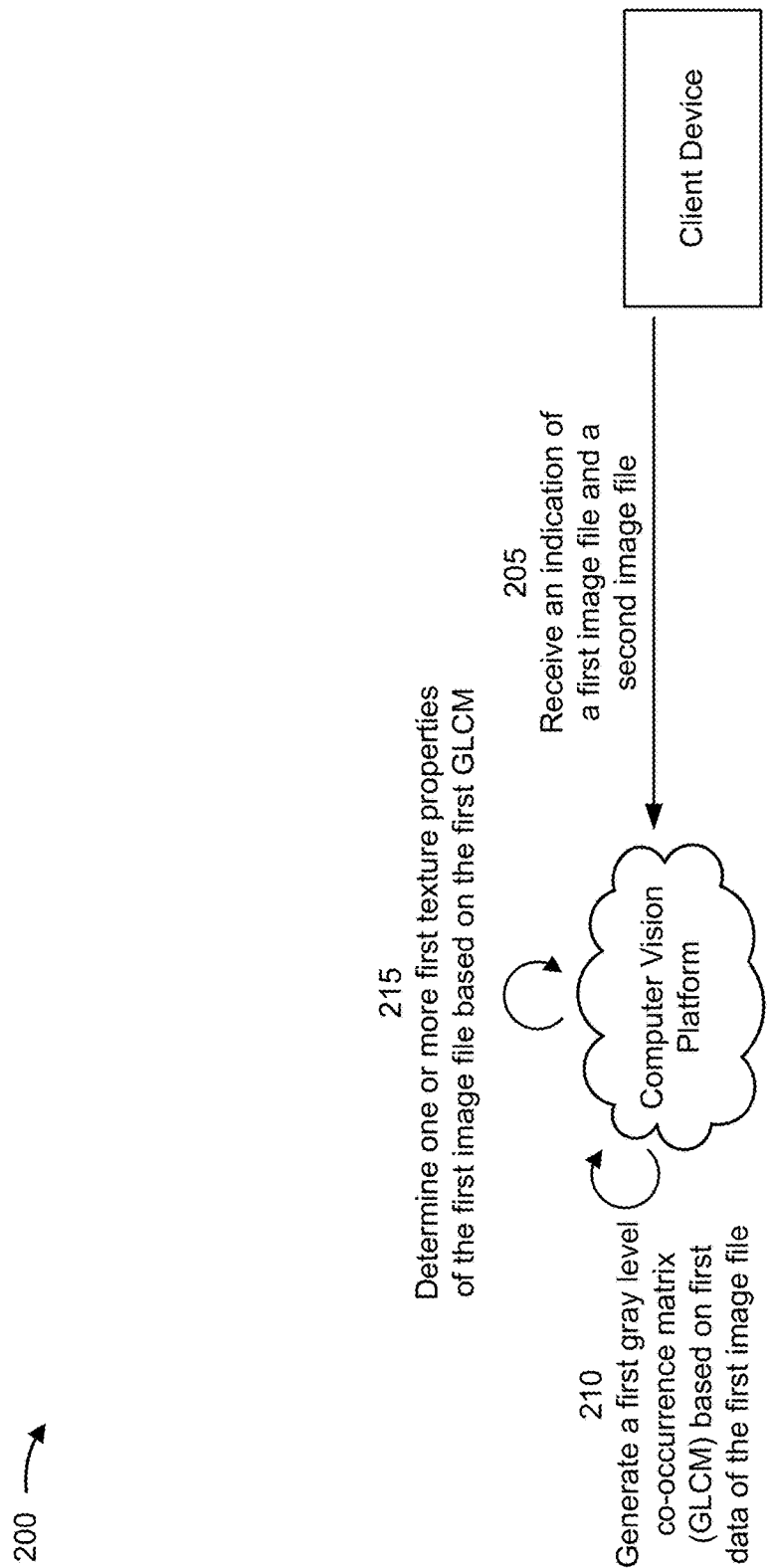
FIGS. 2A-2C are diagrams of an example implementation of determining texture properties of a set of image files for machine learning data augmentation.
Figure 2B:
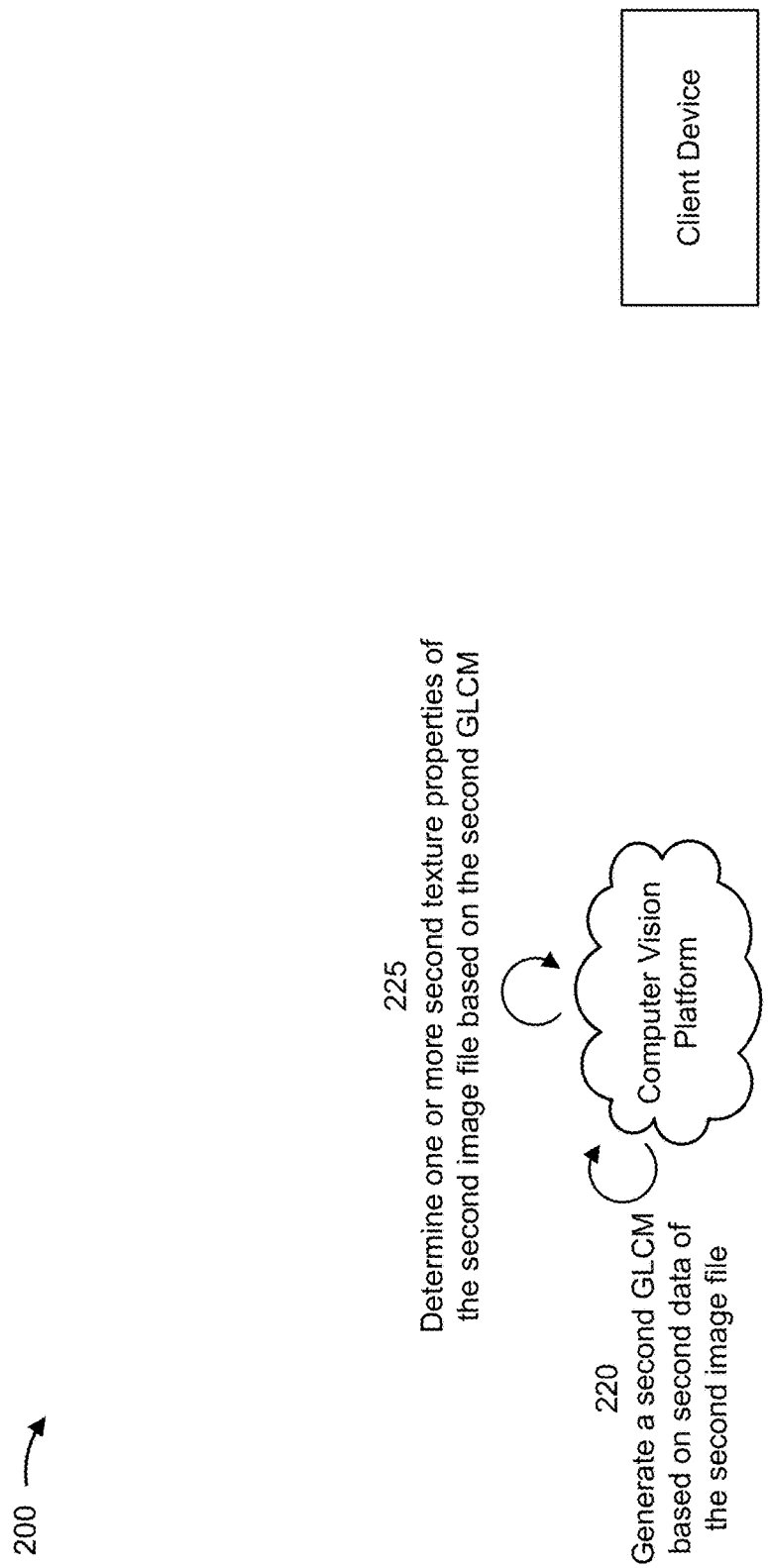
Figure 2C:
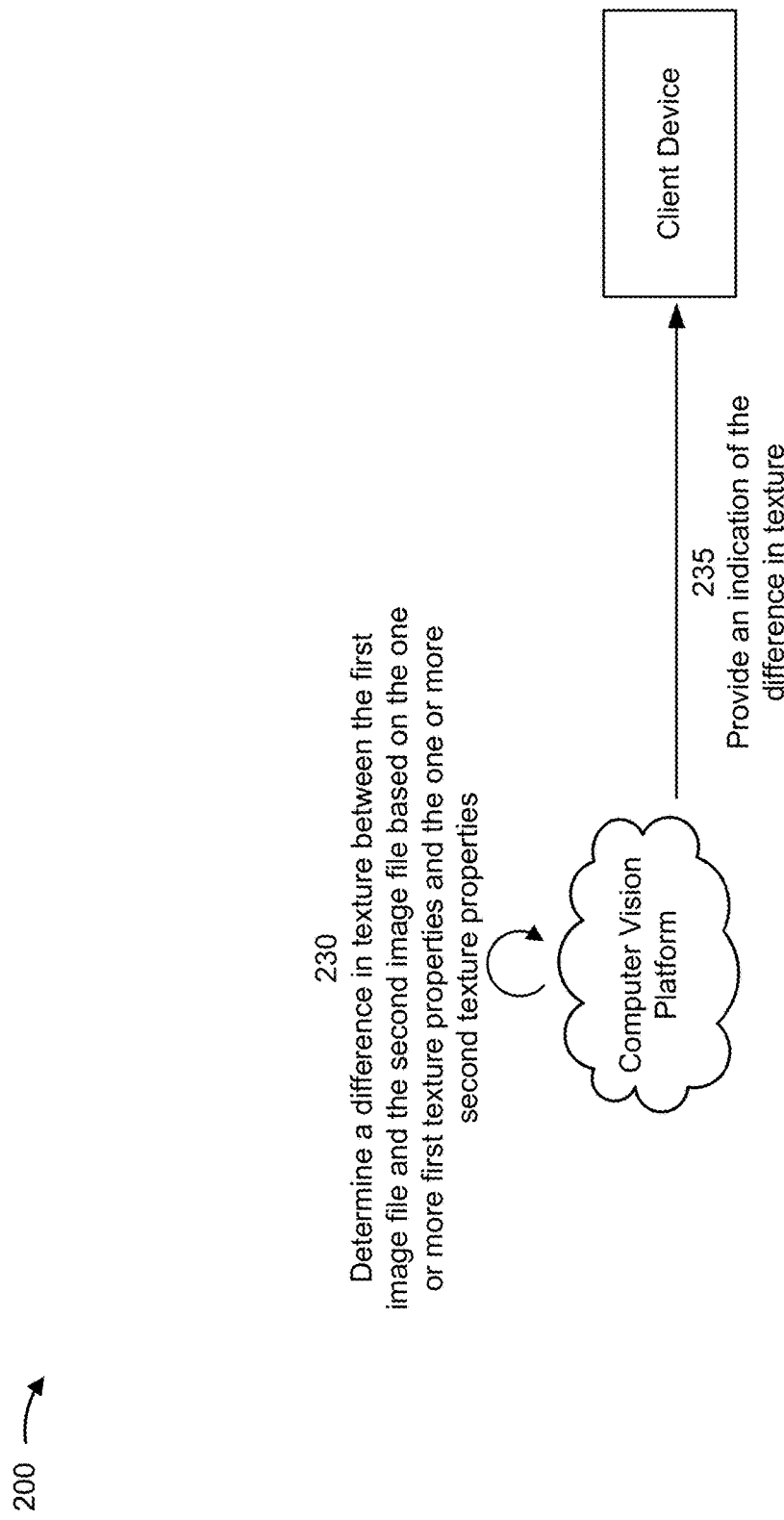

FIGS. 2A-2C are diagrams of an example implementation 200 of determining texture properties of a set of image files for machine learning data augmentation. The example implementation 200 includes an example of determining one or more texture properties for one or more image files. As shown in FIGS. 2A-2C, the example implementation 200 includes a computer vision platform and a client device. These devices are described in more detail below in connection with FIG. 4 and FIG. 5.

At 205 in FIG. 2A, the computer vision platform may receive, from the client device, an indication of a first image file and a second image file. The computer vision platform may receive the indication directly from the client device or through a network.

At 210 in FIG. 2A, the computer vision platform may generate a first gray level co-occurrence matrix (GLCM) based on first data of the first image file. The first GLCM counts the quantity of co-occurrence of neighboring gray levels in the first image file. The first GLCM is a square matrix that has a dimension of the quantity of gray levels N (e.g., 255 gray levels or another quantity of gray levels) in a region of interest of the first image file. The first GLCM may be normalized such that the first GLCM represents the frequency or probability of each combination of gray levels to occur in the first image file.

At 215 in FIG. 2A, the computer vision platform may determine one or more first texture properties of the first image file based on the first GLCM. The one or more first texture properties may include Haralick's texture features, such as entropy, correlation, contrast, angular second moment, energy, homogeneity, and/or dissimilarity, among other examples. In some implementations, the computer vision platform may determine one or more first texture properties of the first image file using a histogram-equalized version of the first image file.

At 220 in FIG. 2B, the computer vision platform may generate a second GLCM based on second data of the second image file. The computer vision platform may generate the second GLCM in a similar manner as described above for the first GLCM. At 225 in FIG. 2B, the computer vision platform may determine one or more second texture properties of the second image file based on the second GLCM. The computer vision platform may determine the one or more second texture properties of the second image file in a similar manner as described above for the one or more first texture properties.

At 230 in FIG. 2C, the computer vision platform may determine a difference in texture between the first image file and the second image file based on the one or more first texture properties and the one or more second texture properties. The computer vision platform may determine the difference in texture between the first image file and the second image file by comparing the one or more first texture properties and the one or more second texture properties.

At 235 in FIG. 2C, the computer vision platform may provide (e.g., to the client device) an indication of the difference in texture between the first image file and the second image file. In some implementations, the indication in texture may be an indication of a numerical difference between texture properties of the one or more first texture properties and the one or more second texture properties. In some implementations, the indication in texture may be a visual representation of the difference between texture properties of the one or more first texture properties and the one or more second texture properties. For example, the indication in texture may be a graph, a data plot, and/or another type of visual representation of the difference between texture properties of the one or more first texture properties and the one or more second texture properties.

In some implementations, the computer vision platform may provide an indication of whether to perform image texture manipulation techniques described in connection with FIGS. 1A-1F to generalize the texture properties of the first image file and the second image file. The computer vision platform may determine to provide the indication based on whether the differences in texture properties between the first image file and the second image file satisfy a threshold.

As indicated above, FIGS. 2A-2C are provided as an example. Other examples may differ from what is described with regard to FIGS. 2A-2C.

Figure 3A:
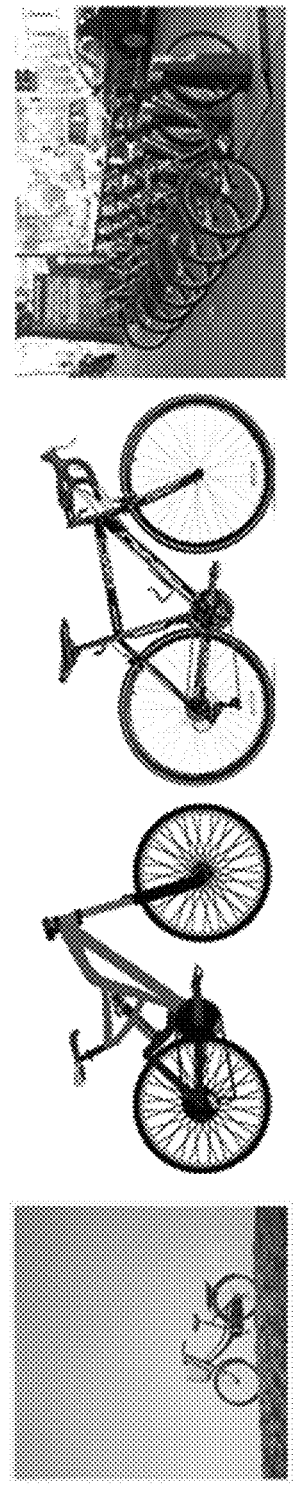
FIGS. 3A-3E are diagrams of an example implementation of texture properties of a set of image files for machine learning data augmentation.

FIGS. 3A-3E are diagrams of an example implementation 300 of texture properties of a set of image files for machine learning data augmentation. As shown in FIG. 3A, the set of image files may include Image File 1, Image File 2, Image File 3, and Image File 4. The set of image files illustrates in FIG. 3A are non-frequency-mixed image files. In other words, the image texture manipulation techniques described in connection with FIGS. 1A-1F has not been performed on the set of image files in FIG. 3A. Image File 1 and Image File 4 may include highly-textured images, whereas Image File 2 and Image File 3 are mostly devoid of texture.

Figure 3B:
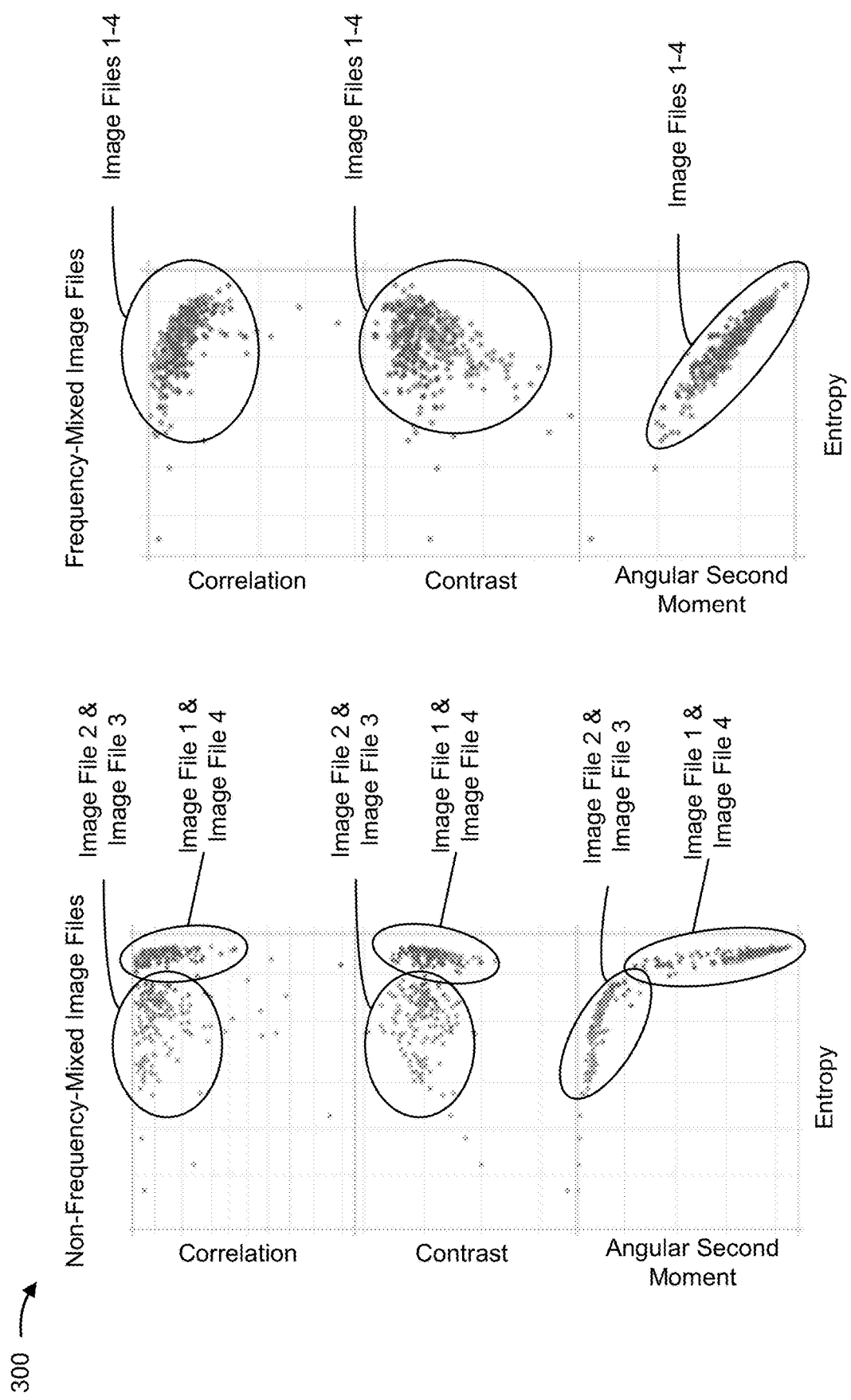

As shown in FIG. 3B, examples of texture properties of the set of image files include correlation, contrast, angular second moment, and entropy. FIG. 3B illustrates correlation, contrast, and angular second moment of the set of image files as a function of entropy. As shown in FIG. 3B for the non-frequency-mixed image files, Image File 2 and Image File 3 generally have similar texture properties (e.g., similar correlation as a function of entropy, similar contrast as a function of entropy, similar angular second moment as a function of entropy) due to Image File 2 and Image File 3 being mostly devoid of texture. As shown in FIG. 3B for the non-frequency-mixed image files, Image File 1 and Image File 4 generally have similar texture properties (e.g., similar correlation as a function of entropy, similar contrast as a function of entropy, similar angular second moment as a function of entropy) due to Image File 1 and Image File 4 being highly-textured images. However, due to the differences in texture between Image Files 2 and 3 and Images File 1 and 4, Image Files 2 and 3 and Images File 1 and 4 have different texture properties (e.g., different correlations as a function of entropy, different contrasts as a function of entropy, different angular second moments as a function of entropy).

As further shown in FIG. 3B, for frequency-mixed image files (e.g., after the image texture manipulation techniques described in connection with FIGS. 1A-1F has not been performed on the set of image files in FIG. 3A), the textural properties are highly similar. For example, Image Files 1-4 have similar correlation as a function of entropy, similar contrast as a function of entropy, and similar angular second moment as a function of entropy after the image texture manipulation techniques described in connection with FIGS. 1A-1F has been performed on the set of image files in FIG. 3A.

Figure 3C:
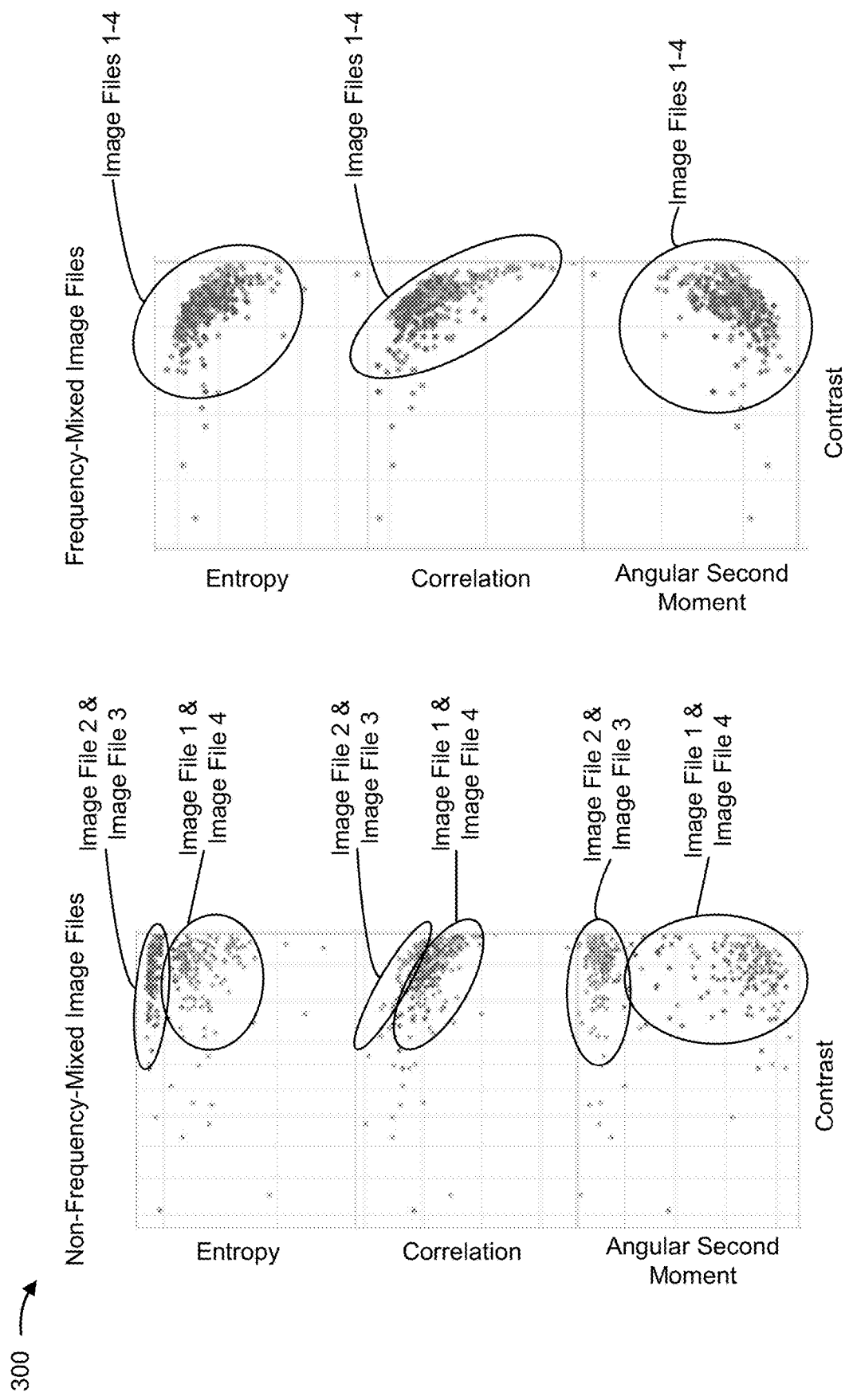

FIG. 3C illustrates entropy, correlation, and angular second moment of the set of image files as a function of contrast. As shown in FIG. 3C for the non-frequency-mixed image files, Image File 2 and Image File 3 generally have similar texture properties (e.g., similar entropy as a function of contrast, similar correlation as a function of contrast, similar angular second moment as a function of contrast) due to Image File 2 and Image File 3 being mostly devoid of texture. As shown in FIG. 3C for the non-frequency-mixed image files, Image File 1 and Image File 4 generally have similar texture properties (e.g., similar entropy as a function of contrast, similar correlation as a function of contrast, similar angular second moment as a function of contrast) due to Image File 1 and Image File 4 being highly-textured images. However, due to the differences in texture between Image Files 2 and 3 and Images File 1 and 4, Image Files 2 and 3 and Images File 1 and 4 have different texture properties (e.g., different entropies as a function of contrast, different correlations as a function of contrast, different angular second moments as a function of contrast).

As further shown in FIG. 3C, for frequency-mixed image files (e.g., after the image texture manipulation techniques described in connection with FIGS. 1A-1F has not been performed on the set of image files in FIG. 3A), the textural properties are highly similar. For example, Image Files 1-4 have similar entropy as a function of contrast, similar correlation as a function of contrast, and similar angular second moment as a function of contrast after the image texture manipulation techniques described in connection with FIGS. 1A-1E has been performed on the set of image files in FIG. 3A.

Figure 3D:
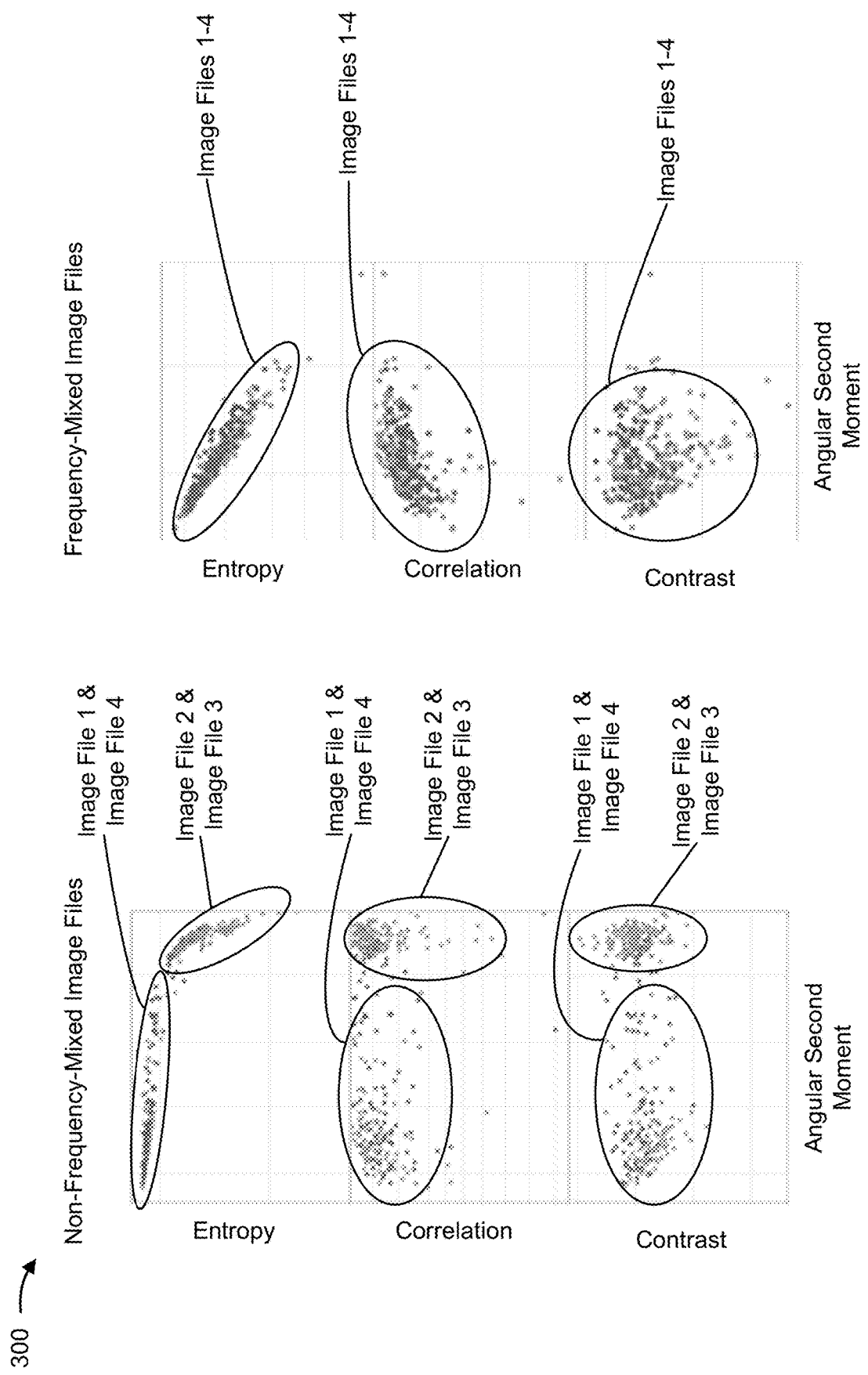

FIG. 3D illustrates entropy, correlation, and contrast of the set of image files as a function of angular second moment. As shown in FIG. 3D for the non-frequency-mixed image files, Image File 2 and Image File 3 generally have similar texture properties (e.g., similar entropy as a function of angular second moment, similar correlation as a function of angular second moment, similar contrast as a function of angular second moment) due to Image File 2 and Image File 3 being mostly devoid of texture. As shown in FIG. 3D for the non-frequency-mixed image files, Image File 1 and Image File 4 generally have similar texture properties (e.g., similar entropy as a function of angular second moment, similar correlation as a function of angular second moment, similar contrast as a function of angular second moment) due to Image File 1 and Image File 4 being highly-textured images. However, due to the differences in texture between Image Files 2 and 3 and Images File 1 and 4, Image Files 2 and 3 and Images File 1 and 4 have different texture properties (e.g., different entropies as a function of angular second moment, different correlations as a function of angular second moment, different contrasts as a function of angular second moment).

As further shown in FIG. 3D, for frequency-mixed image files (e.g., after the image texture manipulation techniques described in connection with FIGS. 1A-1F has not been performed on the set of image files in FIG. 3A), the textural properties are highly similar. For example, Image Files 1-4 have similar entropy as a function of angular second moment, similar correlation as a function of angular second moment, and similar contrast as a function of angular second moment after the image texture manipulation techniques described in connection with FIGS. 1A-1F has been performed on the set of image files in FIG. 3A.

Figure 3E:
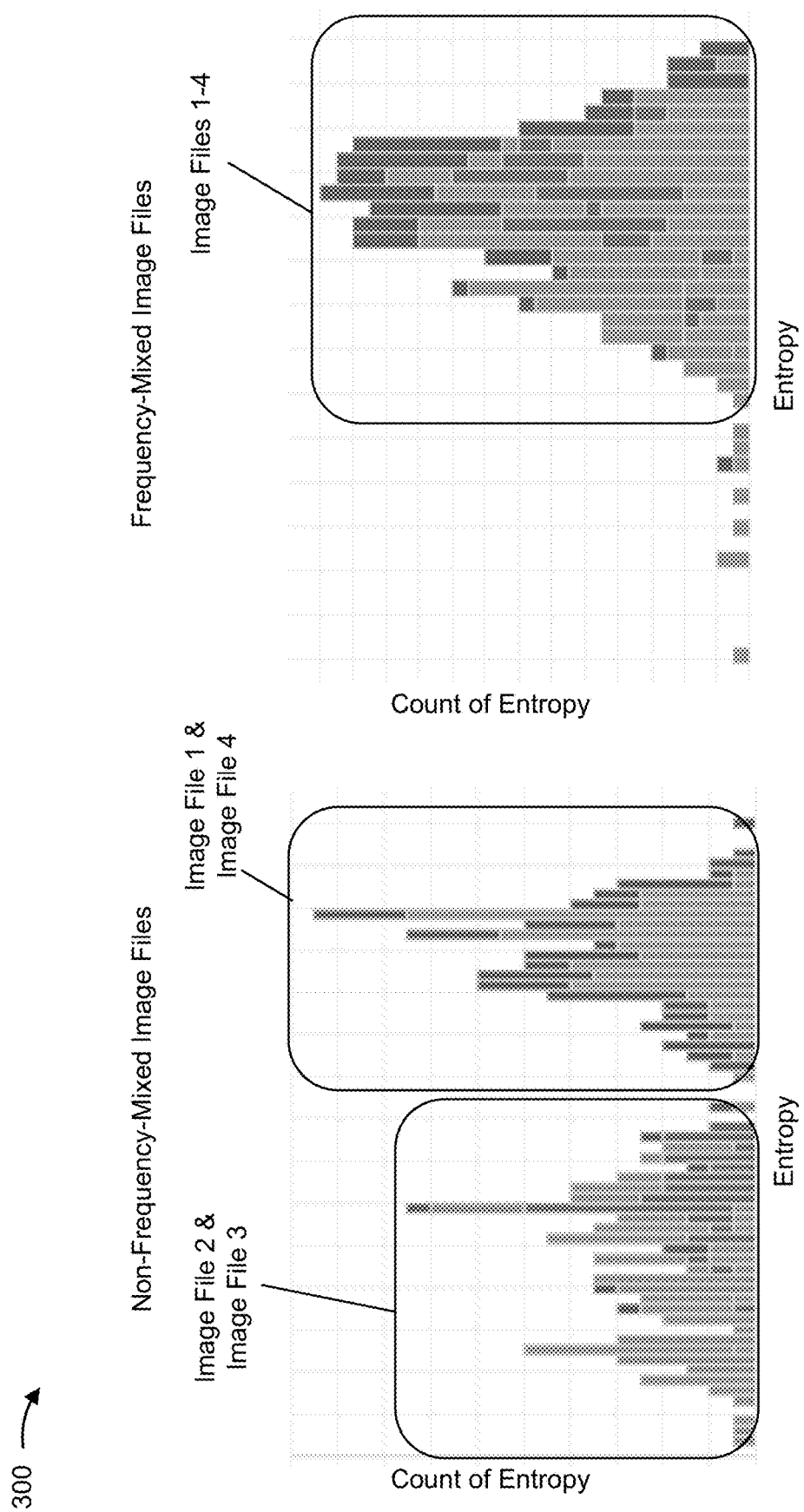

FIG. 3E illustrates the entropy distribution of the set of image files. The entropy distribution is illustrated as a function of count of entropy and entropy. As shown in FIG. 3E for the entropy distribution for non-frequency-mixed image files, Image File 1 and Image File 4 have a relatively small and closely related distribution and Image File 2 and Image File 3 have a relatively small and closely related distribution. However, the difference in entropy distribution between Image Files 1 and 4 and Image Files 2 and 3 indicate that these groups of image files have dissimilar textural composition. As further shown in FIG. 3E for the frequency-mixed image files, Image Files 1-4 have similar entropy distribution, indicating greater similarity in textural composition after the image texture manipulation techniques described in connection with FIGS. 1A-1F has been performed on the set of image files in FIG. 3A.

As indicated above, FIGS. 3A-3E are provided as an example. Other examples may differ from what is described with regard to FIGS. 3A-3E.

Figure 4:
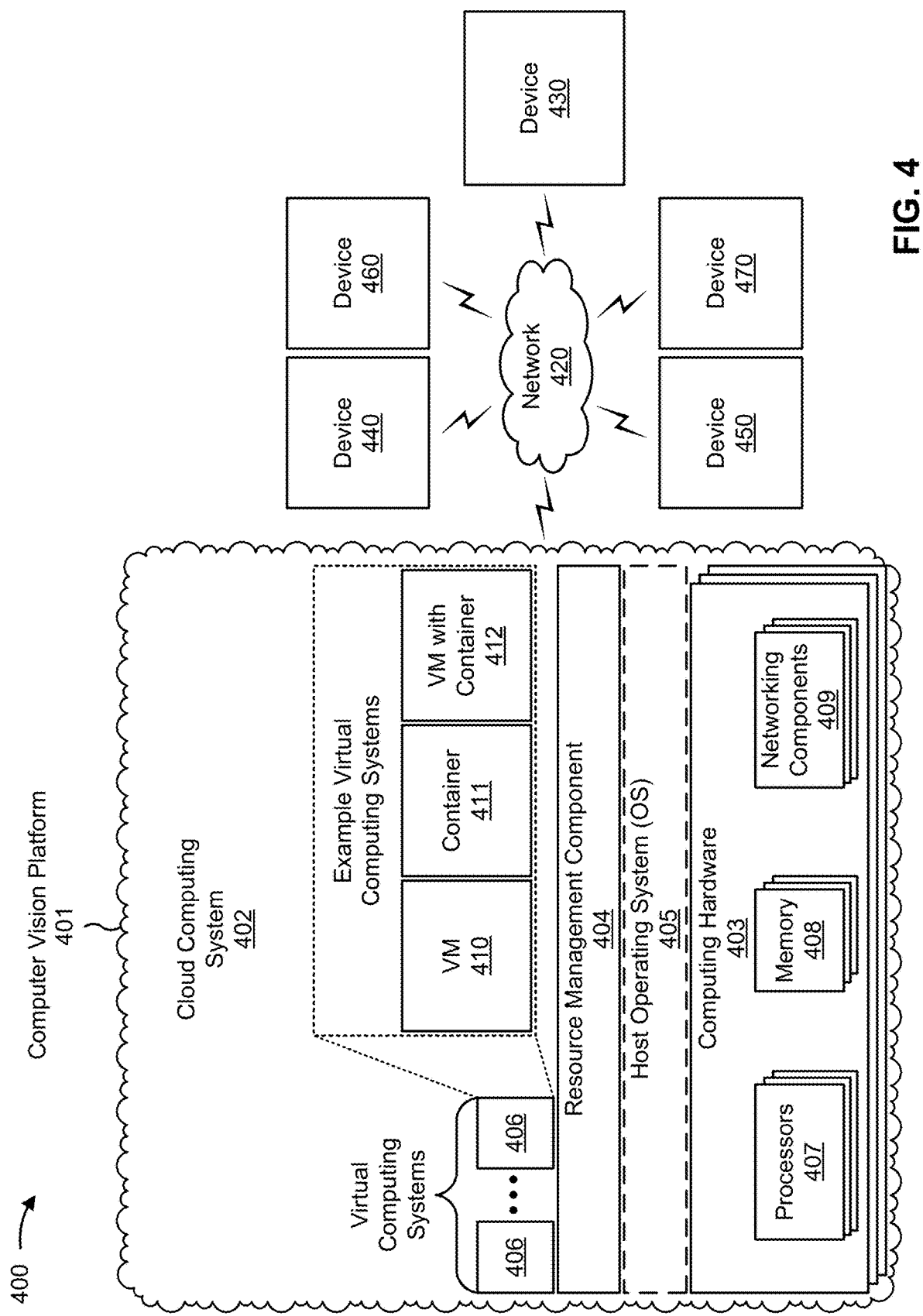
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a computer vision platform 401, which may include one or more elements of and/or may execute within a cloud computing system 402. The computer vision platform 401 may receive an image file, may process the image file using a machine learning model to identify one or more objects in the image file, may classify the image file, may classify an object in the image file, and/or may perform other aspects of computer vision associated with the image file. The computer vision platform 401 may provide an output based on processing the image file. The computer vision platform 401 may train on a set of image files (e.g., a set of training image files) that may be augmented using techniques described herein. The computer vision platform 401 may test on a set of image files (e.g., a set of test image files) that may be augmented using techniques described herein.

The cloud computing system 402 may include one or more elements 403-412, as described in more detail below. As further shown in FIG. 4, environment 400 may include a network 420 and one or more client devices, such as a device 430, a device 440, a device 450, a device 460, and/or a device 470. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the computer vision platform 401 may include one or more elements 403-412 of the cloud computing system 402, may execute within the cloud computing system 402, and/or may be hosted within the cloud computing system 402, in some implementations, the computer vision platform 401 may not be cloud-based (e.g., may be implemented outside of a cloud computing system) or may be partially cloud-based. For example, the computer vision platform 401 may include one or more devices that are not part of the cloud computing system 402, such as device 500 of FIG. 5, which may include a standalone server or another type of computing device. The computer vision platform 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The client device 430-470 may include one or more devices capable of receiving, generating, storing, processing, and/or providing information associated with machine learning queries, machine learning data augmentation, and/or other aspects of machine learning, as described elsewhere herein. The client device 430-470 may include a communication device and/or a computing device. For example, the client device 430-470 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The client device 430-470 may provide an image file to the computer vision platform 401 such that the computer vision platform 401 may process the image file using a machine learning model to identify one or more objects in the image file, to classify the image file, to classify an object in the image file, and/or to perform other aspects of computer vision associated with the image file. The client device 430-470 may receive an output from the computer vision platform 401 based on processing the image file.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
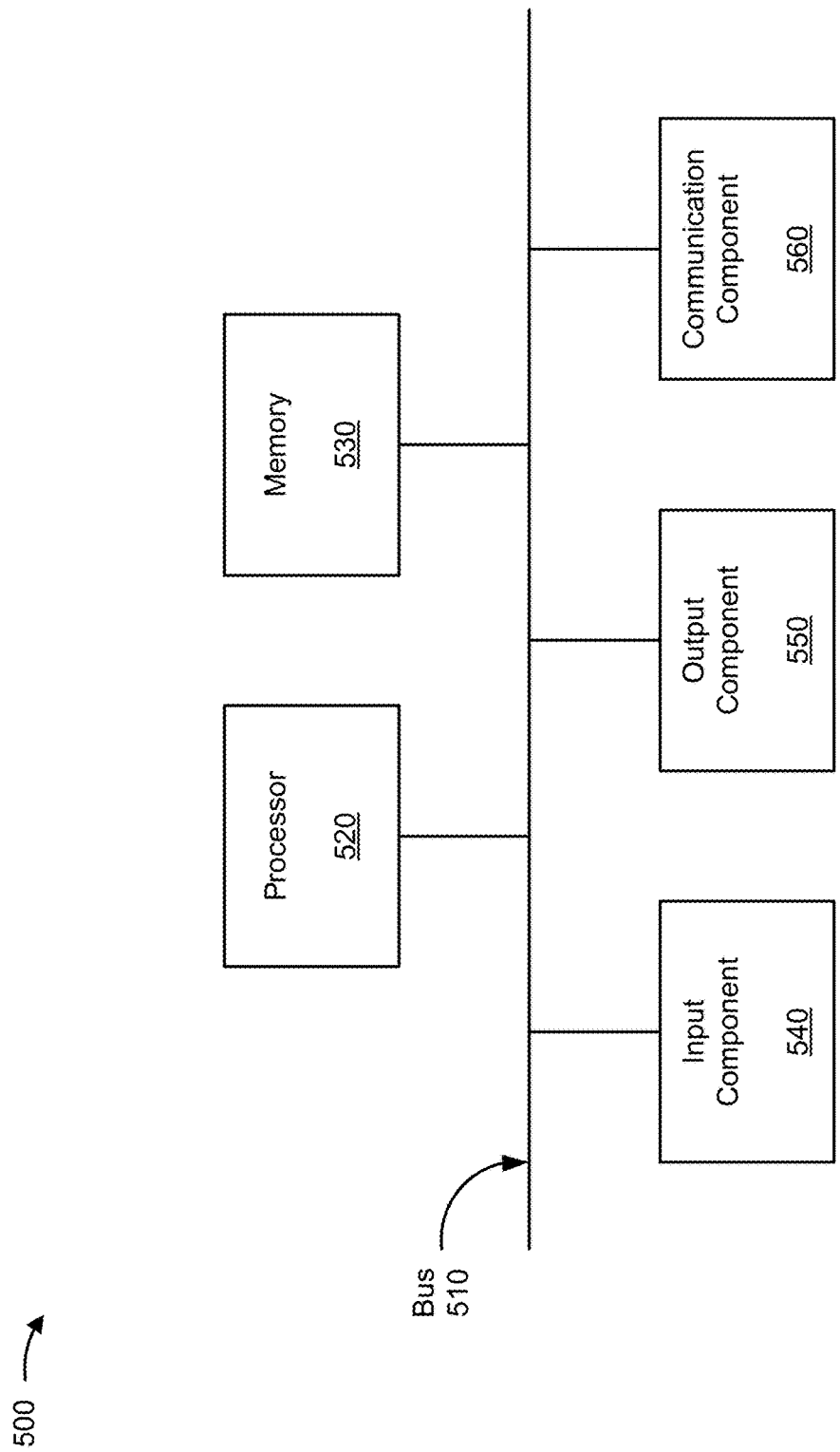
FIG. 5 is a diagram of example components of a device associated with image texture manipulation for machine learning data augmentation.

FIG. 5 is a diagram of example components of a device 500 associated with image texture manipulation for machine learning data augmentation. The device 500 may correspond to the computer vision platform of FIGS. 1A-1F, the computer vision platform of FIGS. 2A-2C, the computer vision platform 401 of FIG. 4, the client device of FIGS. 1A-1F, the client device of FIGS. 2A-2C, and/or one or more of the devices 430-470 of FIG. 4, among other examples. In some implementations, the computer vision platform of FIGS. 1A-1F, the computer vision platform of FIGS. 2A-2C, the computer vision platform 401 of FIG. 4, the client device of FIGS. 1A-1F, the client device of FIGS. 2A-2C, and/or one or more of the devices 430-470 of FIG. 4, may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory).

The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
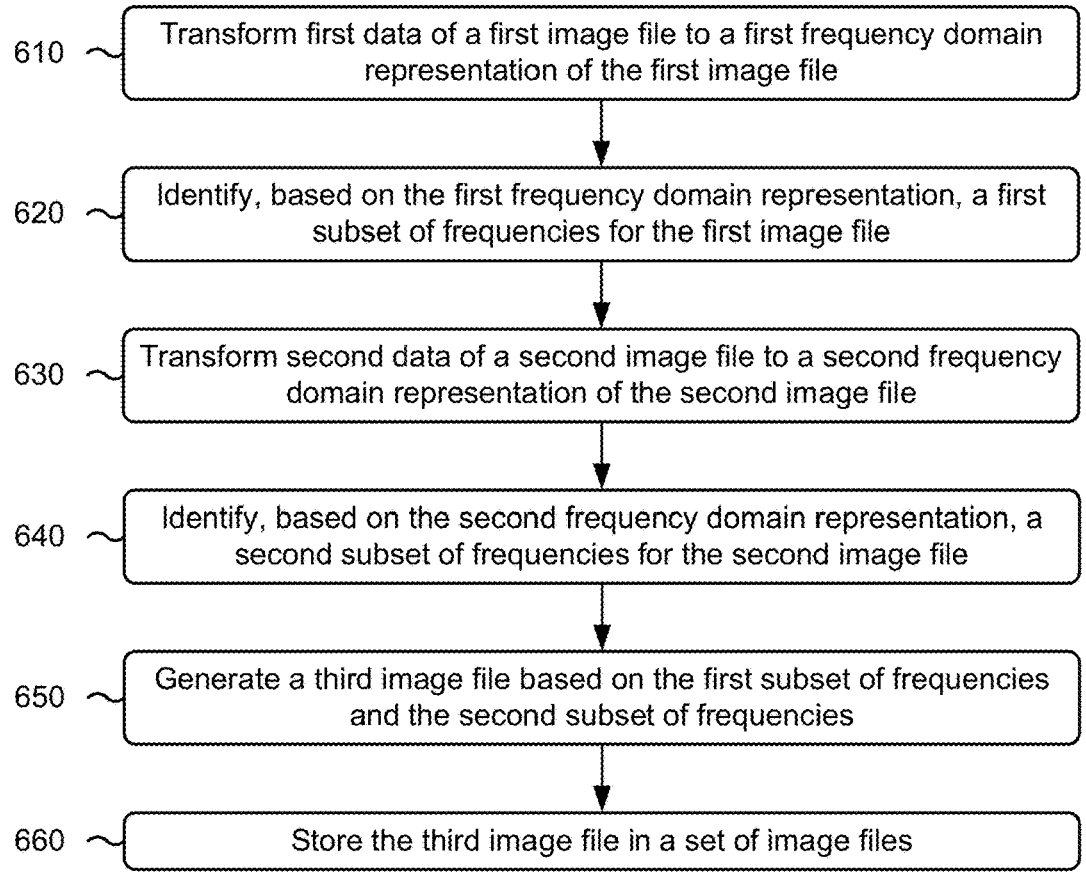
FIG. 6 is a flowchart of an example method associated with image texture manipulation for machine learning data augmentation.

FIG. 6 is a flowchart of an example method 600 associated with image texture manipulation for machine learning data augmentation. In some implementations, a computer vision platform (e.g., the computer vision platform 401, the device 500) may perform or may be configured to perform the method 600. In some implementations, another device or a group of devices separate from or including the computer vision platform (e.g., a device 430-470) may perform or may be configured to perform the method 600. Additionally, or alternatively, one or more components of the computer vision platform (e.g., the cloud computing system 402, the computing hardware 403, the processors 407, the memory 408, the networking components 409, the processor 520, the memory 530, the input component 540, the output component 550, the communication component 560) may perform or may be configured to perform the method 600. Thus, means for performing the method 600 may include the computer vision platform and/or one or more components of the computer vision platform. Additionally, or alternatively, a non-transitory computer-readable medium may store one or more instructions that, when executed by the computer vision platform, cause the computer vision platform to perform the method 600.

As shown in FIG. 6, the method 600 may include transforming first data of a first image file to a first frequency domain representation of the first image file (block 610). For example, the computer vision platform 401 (e.g., using the computing hardware 403, the processors 407, the memory 408, the networking components 409, the processor 520, the memory 530, the input component 540, the output component 550, and/or the communication component 560) may transform first data of a first image file to a first frequency domain representation of the first image file, as described above in connection with 110 of FIG. 1B.

As further shown in FIG. 6, the method 600 may include identifying, based on the first frequency domain representation, a first subset of frequencies for the first image file (block 620). For example, the computer vision platform 401 (e.g., using the computing hardware 403, the processors 407, the memory 408, the networking components 409, the processor 520, the memory 530, the input component 540, the output component 550, and/or the communication component 560) may identify, based on the first frequency, as described above in connection with 115 of FIG. 1B.

As further shown in FIG. 6, the method 600 may include transforming second data of a second image file to a second frequency domain representation of the second image file (block 630). For example, the computer vision platform 401 (e.g., using the computing hardware 403, the processors 407, the memory 408, the networking components 409, the processor 520, the memory 530, the input component 540, the output component 550, and/or the communication component 560) may transform second data of a second image file to a second frequency domain representation of the second image file, as described above in connection with 125 of FIG. 1D.

As further shown in FIG. 6, the method 600 may include identifying, based on the second frequency domain representation, a second subset of frequencies for the second image file (block 640). For example, the computer vision platform 401 (e.g., using the computing hardware 403, the processors 407, the memory 408, the networking components 409, the processor 520, the memory 530, the input component 540, the output component 550, and/or the communication component 560) may identify, based on the second frequency domain representation, a second subset of frequencies for the second image file, a described above in connection with 130 of FIG. 1D.

As further shown in FIG. 6, the method 600 may include generating a third image file based on the first subset of frequencies and the second subset of frequencies (block 650). For example, the computer vision platform 401 (e.g., using the computing hardware 403, the processors 407, the memory 408, the networking components 409, the processor 520, the memory 530, the input component 540, the output component 550, and/or the communication component 560) may generate a third image file based on the first subset of frequencies and the second subset of frequencies, as described above in connection with 135 of FIG. 1E.

As further shown in FIG. 6, the method 600 may include storing the third image file in a set of image files (block 660). For example, the computer vision platform 401 (e.g., using the computing hardware 403, the processors 407, the memory 408, the networking components 409, the processor 520, the memory 530, the input component 540, the output component 550, and/or the communication component 560) may store the third image file in a set of image files, as described above in connection with 140 of FIG. 1E.

The method 600 may include additional aspects, such as any single aspect or any combination of aspects described below and/or described in connection with one or more other methods or operations described elsewhere herein.

In a first aspect, the first subset of frequencies is included in a range of greater than $0^{th}$ of an image size of the first image file and approximately $\frac{1}{100}^{th}$ of the image size of the first image file, and wherein the second subset of frequencies is included in a range of greater than $0^{th}$ of an image size of the second image file and approximately $\frac{1}{100}^{th}$ of the image size of the second image file.

In a second aspect, alone or in combination with the first aspect, the first subset of frequencies is included in a range of approximately $\frac{2}{3}^{rd}$ of an image size of the first image file and less than the image size of the first image file, and wherein the second subset of frequencies is included in a range of approximately $\frac{2}{3}^{rd}$ of an image size of the second image file and less than the image size of the second image file. In a third aspect, alone or in combination with one or more of the first and second aspects, the method 600 includes applying a discrete cosine transformation to the first image file to transform the first data of the first image file to the first frequency domain representation of the first image file.

In a fourth aspect, alone or in combination with one or more of the first through third aspects, the method 600 includes applying another discrete cosine transformation to the second image file to transform the second data of the second image file to the second frequency domain representation of the second image file. In a fifth aspect, alone or in combination with one or more of the first through fourth aspects, the method 600 includes resizing the second image file to a size of the first image file prior to applying the other discrete cosine transformation to the second image file. In a sixth aspect, alone or in combination with one or more of the first through fifth aspects, the method 600 includes performing a band pass swap to replace the first subset of frequencies in the first image file with the second subset of frequencies.

In a seventh aspect, alone or in combination with one or more of the first through sixth aspects, the method 600 includes performing another band pass swap to replace the second subset of frequencies in the second image file with the first subset of frequencies to generate a fourth image file, and storing the fourth image file in the set of image files. In an eighth aspect, alone or in combination with one or more of the first through seventh aspects, the method 600 includes training a machine learning model using the set of image files.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

Figure 7:
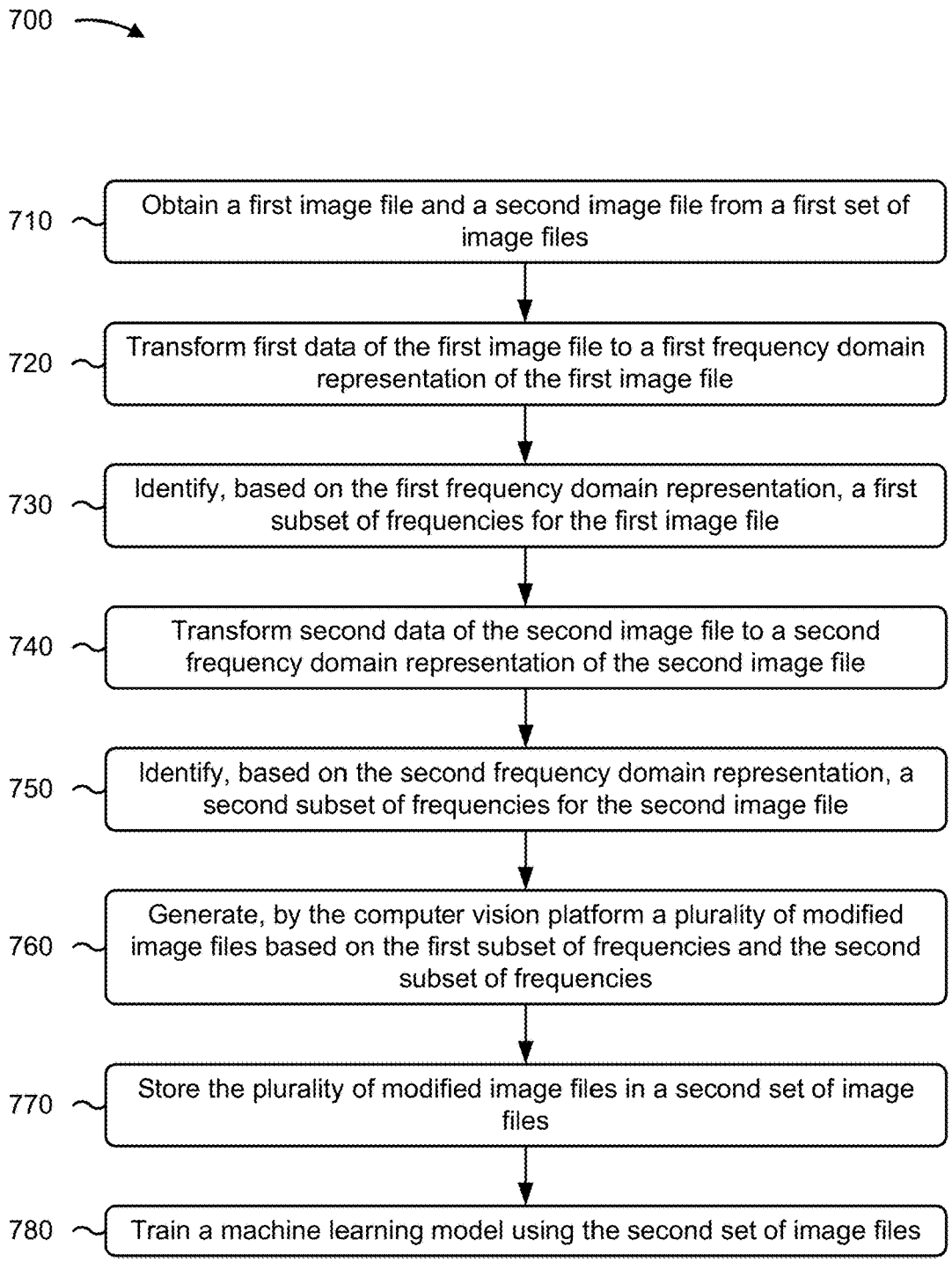
FIG. 7 is a flowchart of an example method associated with image texture manipulation for machine learning data augmentation.

FIG. 7 is a flowchart of an example method 700 associated with image texture manipulation for machine learning data augmentation. In some implementations, a computer vision platform (e.g., the computer vision platform 401, the device 500) may perform or may be configured to perform the method 600. In some implementations, another device or a group of devices separate from or including the computer vision platform (e.g., a device 430-470) may perform or may be configured to perform the method 700. In some implementations, another device or a group of devices separate from or including the computer vision platform (e.g., a device 430-470) may perform or may be configured to perform the method 700. Additionally, or alternatively, one or more components of the computer vision platform (e.g., the cloud computing system 402, the computing hardware 403, the processors 407, the memory 408, the networking components 409, the processor 520, the memory 530, the input component 540, the output component 550, the communication component 560) may perform or may be configured to perform the method 700. Thus, means for performing the method 700 may include the computer vision platform and/or one or more components of the computer vision platform. Additionally, or alternatively, a non-transitory computer-readable medium may store one or more instructions that, when executed by the computer vision platform, cause the computer vision platform to perform the method 700.

As shown in FIG. 7, the method 700 may include obtaining a first image file and a second image file from a first set of image files (block 710). For example, the computer vision platform 401 (e.g., using the computing hardware 403, the processors 407, the memory 408, the networking components 409, the processor 520, the memory 530, the input component 540, the output component 550, and/or the communication component 560) may obtain a first image file and a second image file from a first set of image files, as described above in connection with 105 of FIG. 1B and 120 of FIG. 1D.

As further shown in FIG. 7, the method 700 may include transforming first data of the first image file to a first frequency domain representation of the first image file (block 720). For example, the computer vision platform 401 (e.g., using the computing hardware 403, the processors 407, the memory 408, the networking components 409, the processor 520, the memory 530, the input component 540, the output component 550, and/or the communication component 560) may transform first data of the first image file to a first frequency domain representation of the first image file, as described above in connection with 110 of FIG. 1B.

As further shown in FIG. 7, the method 700 may include identifying, based on the first frequency domain representation, a first subset of frequencies for the first image file (block 730). For example, the computer vision platform 401 (e.g., using the computing hardware 403, the processors 407, the memory 408, the networking components 409, the processor 520, the memory 530, the input component 540, the output component 550, and/or the communication component 560) may identify, based on the first frequency domain representation, a first subset of frequencies for the first image file, as described above in connection with 115 of FIG. 1B.

As further shown in FIG. 7, the method 700 may include transforming second data of the second image file to a second frequency domain representation of the second image file (block 740). For example, the computer vision platform 401 ((e.g., using the computing hardware 403, the processors 407, the memory 408, the networking components 409, the processor 520, the memory 530, the input component 540, the output component 550, and/or the communication component 560) may transform second data of the second image file to a second frequency domain representation of the second image file, as described above in connection with 125 of FIG. 1D.

As further shown in FIG. 7, the method 700 may include identifying, based on the second frequency domain representation, a second subset of frequencies for the second image file (block 750). For example, the computer vision platform 401 (e.g., using the computing hardware 403, the processors 407, the memory 408, the networking components 409, the processor 520, the memory 530, the input component 540, the output component 550, and/or the communication component 560) may identify, based on the second frequency domain representation, a second subset of frequencies for the second image file, as described above in connection with 130 of FIG. 1D.

As further shown in FIG. 7, the method 700 may include generating, by the computer vision platform a plurality of modified image files based on the first subset of frequencies and the second subset of frequencies (block 760). For example, the computer vision platform 401 (e.g., using the computing hardware 403, the processors 407, the memory 408, the networking components 409, the processor 520, the memory 530, the input component 540, the output component 550, and/or the communication component 560) may generate, by the computer vision platform a plurality of modified image files based on the first subset of frequencies and the second subset of frequencies, as described above in connection with 135 of FIG. 1E.

As further shown in FIG. 7, the method 700 may include storing the plurality of modified image files in a second set of image files (block 770). For example, the computer vision platform 401 (e.g., using the computing hardware 403, the processors 407, the memory 408, the networking components 409, the processor 520, the memory 530, the input component 540, the output component 550, and/or the communication component 560) may store the plurality of modified image files in a second set of image files, as described above in connection with 140 of FIG. 1E.

As further shown in FIG. 7, the method 700 may include training a machine learning model using the second set of image files (block 780). For example, the computer vision platform 401 (e.g., using the computing hardware 403, the processors 407, the memory 408, the networking components 409, the processor 520, the memory 530, the input component 540, the output component 550, and/or the communication component 560) may train a machine learning model using the second set of image files, as described above in connection with 145 of FIG. 1F.

The method 700 may include additional aspects, such as any single aspect or any combination of aspects described below and/or described in connection with one or more other methods or operations described elsewhere herein.

In a first aspect, generating the plurality of modified image files comprises generating a third image file, of the plurality of modified image files, in which the first subset of frequencies in the first image file are replaced with the second subset of frequencies of the second image file. In a second aspect, alone or in combination with the first aspect, generating the third image file comprises performing a band pass swap to replace the first subset of frequencies in the first image file with the second subset of frequencies.

In a third aspect, alone or in combination with one or more of the first and second aspects, performing the band pass swap comprises generating a selection band mask based on the first subset of frequencies, applying a Gaussian blur to the selection band mask, and multiplying, after applying the Gaussian blur to the selection band mask, the selection band mask with the second subset of frequencies. In a fourth aspect, alone or in combination with one or more of the first through third aspects, generating the selection band mask comprises generating the selection band mask such that the selection band mask has a quarter circle with an origin at coordinates (0,0), such that the selection band mask has a radius that is based on the first subset of frequencies, and such that the quarter circle has a particular border thickness.

In a fifth aspect, alone or in combination with one or more of the first through fourth aspects, transforming the first data of the first image file to the first frequency domain representation of the first image file comprises applying a discrete cosine transformation to the first image file to transform the first data of the first image file to the first frequency domain representation of the first image file. In a sixth aspect, alone or in combination with one or more of the first through fifth aspects, applying the discrete cosine transformation to the first image file comprises applying the discrete cosine transformation to the first image file to generate an M×N matrix that represents a frequency distribution of the first image file.

In a seventh aspect, alone or in combination with one or more of the first through sixth aspects, transforming the first data of the first image file to the first frequency domain representation of the first image file comprises identifying the first subset of frequencies based on the M×N matrix that represents the frequency distribution of the first image file.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
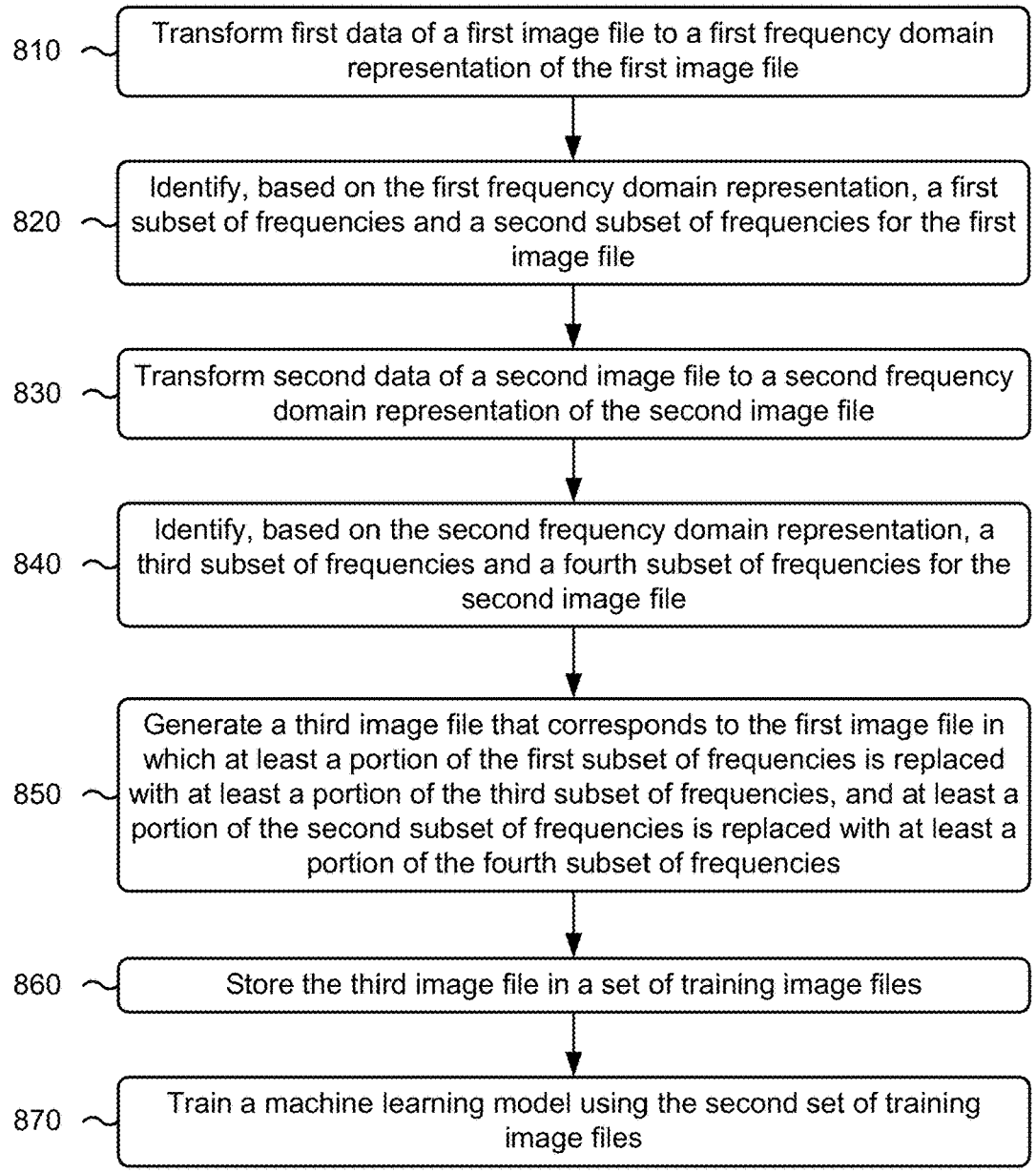
FIG. 8 is a flowchart of an example method associated with image texture manipulation for machine learning data augmentation.

FIG. 8 is a flowchart of an example method 800 associated with image texture manipulation for machine learning data augmentation. In some implementations, a computer vision platform (e.g., the computer vision platform 401, the device 500) may perform or may be configured to perform the method 800. In some implementations, another device or a group of devices separate from or including the computer vision platform (e.g., a device 430-470) may perform or may be configured to perform the method 800. Additionally, or alternatively, one or more components of the computer vision platform (e.g., the cloud computing system 402, the computing hardware 403, the processors 407, the memory 408, the networking components 409, the processor 520, the memory 530, the input component 540, the output component 550, the communication component 560) may perform or may be configured to perform the method 800. Thus, means for performing the method 800 may include the computer vision platform and/or one or more components of the computer vision platform. Additionally, or alternatively, a non-transitory computer-readable medium may store one or more instructions that, when executed by the computer vision platform, cause the computer vision platform to perform the method 800.

As shown in FIG. 8, the method 800 may include transforming first data of a first image file to a first frequency domain representation of the first image file (block 810). For example, the computer vision platform 401 (e.g., using the computing hardware 403, the processors 407, the memory 408, the networking components 409, the processor 520, the memory 530, the input component 540, the output component 550, and/or the communication component 560) may transform first data of a first image file to a first frequency domain representation of the first image file, as described above in connection with 110 of FIG. 1B.

As further shown in FIG. 8, the method 800 may include identifying, based on the first frequency domain representation, a first subset of frequencies and a second subset of frequencies for the first image file (block 820). For example, the computer vision platform 401 (e.g., using the computing hardware 403, the processors 407, the memory 408, the networking components 409, the processor 520, the memory 530, the input component 540, the output component 550, and/or the communication component 560) may identify, based on the first frequency domain representation, a first subset of frequencies and a second subset of frequencies for the first image file, as described above in connection with 115 of FIG. 1B.

As further shown in FIG. 8, the method 800 may include transforming second data of a second image file to a second frequency domain representation of the second image file (block 830). For example, the computer vision platform 401 (e.g., using the computing hardware 403, the processors 407, the memory 408, the networking components 409, the processor 520, the memory 530, the input component 540, the output component 550, and/or the communication component 560) may transform second data of a second image file to a second frequency domain representation of the second image file, as described above in connection with 125 in FIG. 1D.

As further shown in FIG. 8, the method 800 may include identifying, based on the second frequency domain representation, a third subset of frequencies and a fourth subset of frequencies for the second image file (block 840). For example, the computer vision platform 401 (e.g., using the computing hardware 403, the processors 407, the memory 408, the networking components 409, the processor 520, the memory 530, the input component 540, the output component 550, and/or the communication component 560) may identify, based on the second frequency domain representation, a third subset of frequencies and a fourth subset of frequencies for the second image file, as described above in connection with 130 in FIG. 1D.

As further shown in FIG. 8, the method 800 may include generating a third image file that corresponds to the first image file in which at least a portion of the first subset of frequencies is replaced with at least a portion of the third subset of frequencies, and at least a portion of the second subset of frequencies is replaced with at least a portion of the fourth subset of frequencies (block 850). For example, the computer vision platform 401 (e.g., using the computing hardware 403, the processors 407, the memory 408, the networking components 409, the processor 520, the memory 530, the input component 540, the output component 550, and/or the communication component 560) may generate a third image file that corresponds to the first image file in which at least a portion of the first subset of frequencies is replaced with at least a portion of the third subset of frequencies, and at least a portion of the second subset of frequencies is replaced with at least a portion of the fourth subset of frequencies, as described above in connection with 135 of FIG. 1E.

As further shown in FIG. 8, the method 800 may include storing the third image file in a set of training image files (block 860). For example, the computer vision platform 401 (e.g., using the computing hardware 403, the processors 407, the memory 408, the networking components 409, the processor 520, the memory 530, the input component 540, the output component 550, and/or the communication component 560) may store the third image file in a set of training image files, as described above in connection with 140 of FIG. 1F.

As further shown in FIG. 8, the method 800 may include training a machine learning model using the second set of training image files (block 870). For example, the computer vision platform 401 (e.g., using the computing hardware 403, the processors 407, the memory 408, the networking components 409, the processor 520, the memory 530, the input component 540, the output component 550, and/or the communication component 560) may train a machine learning model using the second set of training image files, as described above in connection with 145 of FIG. 1F.

The method 800 may include additional aspects, such as any single aspect or any combination of aspects described below and/or described in connection with one or more other methods or operations described elsewhere herein.

In a first aspect, the method 800 includes transforming grayscale data of the first image file to a grayscale frequency domain representation of the first image file. In a second aspect, alone or in combination with the first aspect, the method 800 includes transforming red channel data of the first image file to a red channel frequency domain representation of the first image file, transforming green channel data of the first image file to a green channel frequency domain representation of the first image file, and transforming blue channel data of the first image file to a blue channel frequency domain representation of the first image file. In a third aspect, alone or in combination with one or more of the first and second aspects, the method 800 includes identifying, based on the red channel frequency domain representation, a first subset of red frequencies and a second set of red frequencies for the first image file.

In a fourth aspect, alone or in combination with one or more of the first through third aspects, the method 800 includes identifying, based on the green channel frequency domain representation, a first subset of green frequencies and a second subset of green frequencies for the first image file. In a fifth aspect, alone or in combination with one or more of the first through fourth aspects, the method 800 includes identifying, based on the blue channel frequency domain representation, a first subset of blue frequencies and a second subset of blue frequencies for the first image file.

In a sixth aspect, alone or in combination with one or more of the first through fifth aspects, the first subset of frequencies being replaced with the third subset of frequencies, and the second subset of frequencies being replaced with the fourth subset of frequencies, results in mixing of texture properties of the first image file and texture properties the second image file in the third image file. In a seventh aspect, alone or in combination with one or more of the first through sixth aspects, a fifth subset of frequencies of the first image file represents shapes and edges included in the first image file.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

Figure 9:
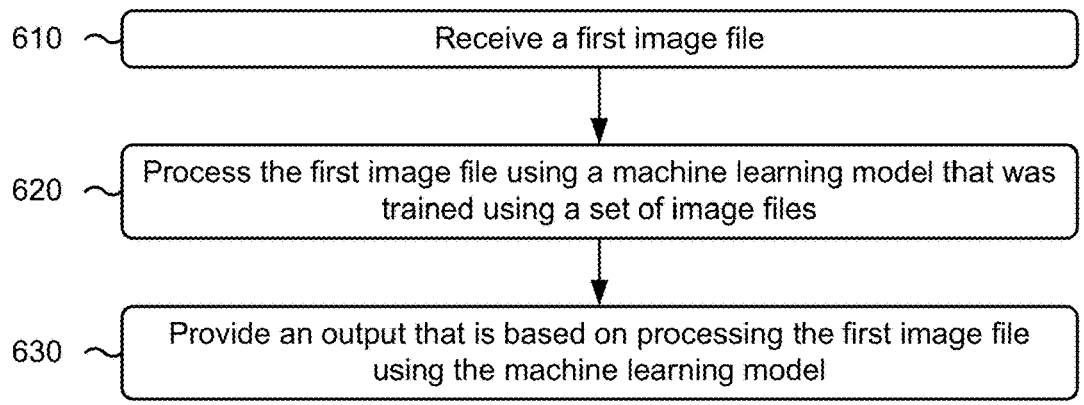
FIG. 9 is a flowchart of an example method associated with image texture manipulation for machine learning data augmentation.

FIG. 9 is a flowchart of an example method 900 associated with image texture manipulation for machine learning data augmentation. In some implementations, a computer vision platform (e.g., the computer vision platform 401, the device 500) may perform or may be configured to perform the method 900. In some implementations, another device or a group of devices separate from or including the computer vision platform (e.g., a device 430-470) may perform or may be configured to perform the method 900. Additionally, or alternatively, one or more components of the computer vision platform (e.g., the cloud computing system 402, the computing hardware 403, the processors 407, the memory 408, the networking components 409, the processor 520, the memory 530, the input component 540, the output component 550, the communication component 560) may perform or may be configured to perform the method 900. Thus, means for performing the method 900 may include the computer vision platform and/or one or more components of the computer vision platform. Additionally, or alternatively, a non-transitory computer-readable medium may store one or more instructions that, when executed by the computer vision platform, cause the computer vision platform to perform the method 900.

As shown in FIG. 9, the method 900 may include receiving a first image file (block 910). For example, the computer vision platform 401 (e.g., using the computing hardware 403, the processors 407, the memory 408, the networking components 409, the processor 520, the memory 530, the input component 540, the output component 550, and/or the communication component 560) may receive a first image file from a client device 430-470, as described above in connection with 150 of FIG. 1F.

As further shown in FIG. 9, the method 900 may include processing the first image file using a machine learning model that was trained using a set of image files (block 920). For example, the computer vision platform 401 (e.g., using the computing hardware 403, the processors 407, the memory 408, the networking components 409, the processor 520, the memory 530, the input component 540, the output component 550, and/or the communication component 560) may process the first image file using a machine learning model that was trained using a set of image files, as described above in connection with 155 of FIG. 1F. In some implementations, the set of image files includes a plurality of modified image files. In some implementations, the plurality of modified image files were generated based on a first subset of frequencies for a second image file and a second subset of frequencies for a third image file. In some implementations, the first subset of frequencies is based on a transformation of the second image file to a first frequency domain representation of the second image file. In some implementations, the second subset of frequencies is based on a transformation of the third image file to a second frequency domain representation of the third image file.

As further shown in FIG. 9, the method 900 may include providing an output based on processing the first image file using the machine learning model (block 930). For example, the computer vision platform 401 (e.g., using the computing hardware 403, the processors 407, the memory 408, the networking components 409, the processor 520, the memory 530, the input component 540, the output component 550, and/or the communication component 560) may provide an output based on processing the first image file using the machine learning model, as described above in connection with 160 in FIG. 1F.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

In some implementations, a computer vision platform includes a memory; and one or more components configured to transform first data of a first image file to a first frequency domain representation of the first image file; identify, based on the first frequency domain representation, a first subset of frequencies for the first image file; transform second data of a second image file to a second frequency domain representation of the second image file; identify, based on the second frequency domain representation, a second subset of frequencies for the second image file; generate a third image file based on the first subset of frequencies and the second subset of frequencies; and store the third image file in a set of image files.

In some implementations, a method includes obtaining, by a computer vision platform, a first image file and a second image file from a first set of image files; transforming, by the computer vision platform, first data of the first image file to a first frequency domain representation of the first image file; identifying, by the computer vision platform and based on the first frequency domain representation, a first subset of frequencies for the first image file; transforming, by the computer vision platform, second data of the second image file to a second frequency domain representation of the second image file; identifying, by the computer vision platform and based on the second frequency domain representation, a second subset of frequencies for the second image file; generating, by the computer vision platform a plurality of modified image files based on the first subset of frequencies and the second subset of frequencies; storing, by the computer vision platform, the plurality of modified image files in a second set of image files; and training, by the computer vision platform, a machine learning model using the second set of image files.

In some implementations, a non-transitory computer-readable medium storing a set of instructions includes one or more instructions that, when executed by one or more processors of a computer vision platform, cause the computer vision platform to transform first data of a first image file to a first frequency domain representation of the first image file; identify, based on the first frequency domain representation, a first subset of frequencies and a second subset of frequencies for the first image file; transform second data of a second image file to a second frequency domain representation of the second image file; identify, based on the second frequency domain representation, a third subset of frequencies and a fourth subset of frequencies for the second image file; generate a third image file that corresponds to the first image file in which the first subset of frequencies is replaced with the third subset of frequencies and the second subset of frequencies is replaced with the fourth subset of frequencies; store the third image file in a set of training image files; and train a machine learning model using the second set of training image files.

In some implementations, a method may include receiving, by a computer vision platform, a first image file; processing, by the computer vision platform, the first image file using a machine learning model that was trained using a set of image files, where the set of image files includes a plurality of modified image files, where the plurality of modified image files were generated based on a first subset of frequencies for a second image file and a second subset of frequencies for a third image file, where the first subset of frequencies is based on a transformation of the second image file to a first frequency domain representation of the second image file, and where the second subset of frequencies is based on a transformation of the third image file to a second frequency domain representation of the third image file; and providing an output based on processing the first image file using the machine learning model.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A computer vision platform, comprising:
   a memory; and
   one or more components configured to:
   transform first data of a first image file to a first frequency domain representation of the first image file;
   identify, based on the first frequency domain representation, a first subset of frequencies for the first image file;
   transform second data of a second image file to a second frequency domain representation of the second image file;
   identify, based on the second frequency domain representation, a second subset of frequencies for the second image file;
   generate a third image file based on the first subset of frequencies and the second subset of frequencies; and
   store the third image file in a set of image files.

2. The computer vision platform of claim 1, wherein the first subset of frequencies corresponds to low frequency information in the first image file and is included in a range of greater than $0^{th}$ of an image size of the first image file and approximately $\frac{1}{100}^{th}$ of the image size of the first image file; and
   wherein the second subset of frequencies corresponds to low frequency information in the second image file and is included in a range of greater than $0^{th}$ of an image size of the second image file and approximately $\frac{1}{100}^{th}$ of the image size of the second image file.

3. The computer vision platform of claim 1, wherein the first subset of frequencies corresponds to high frequency information in the first image file and is included in a range of approximately $\frac{2}{3}^{rd}$ of an image size of the first image file and less than the image size of the first image file; and
   wherein the second subset of frequencies corresponds to high frequency information in the first image file and is included in a range of approximately $\frac{2}{3}^{rd}$ of an image size of the second image file and less than the image size of the second image file.

4. The computer vision platform of claim 1, wherein the one or more components, to transform the first data of the first image file to the first frequency domain representation of the first image file, are configured to:
   apply a discrete cosine transformation to the first image file to transform the first data of the first image file to the first frequency domain representation of the first image file.

5. The computer vision platform of claim 4, wherein the one or more components, to transform the second data of the second image file to the second frequency domain representation of the second image file, are configured to:
   apply another discrete cosine transformation to the second image file to transform the second data of the second image file to the second frequency domain representation of the second image file.

6. The computer vision platform of claim 1, wherein the one or more components, to generate the third image file based on the first subset of frequencies and the second subset of frequencies, are configured to:
   perform a band pass swap to replace the first subset of frequencies in the first image file with the second subset of frequencies.

7. The computer vision platform of claim 6, wherein the one or more components are further configured to:
perform another band pass swap to replace the second subset of frequencies in the second image file with the first subset of frequencies to generate a fourth image file; and
store the fourth image file in the set of image files.

8. A method, comprising:
receiving, by a computer vision platform, a first image file;
processing, by the computer vision platform, the first image file using a machine learning model that was trained using a set of image files,
wherein the set of image files includes a plurality of modified image files,
wherein the plurality of modified image files were generated based on a first subset of frequencies for a second image file and a second subset of frequencies for a third image file,
wherein the first subset of frequencies is based on a transformation of the second image file to a first frequency domain representation of the second image file, and
wherein the second subset of frequencies is based on a transformation of the third image file to a second frequency domain representation of the third image file; and
providing, by the computer vision platform, an output based on processing the first image file using the machine learning model.

9. The method of claim 8, further comprising generating the plurality of modified image files by generating a fourth image file, of the plurality of modified image files, in which the first subset of frequencies in the second image file are replaced with the second subset of frequencies of the third image file.

10. The method of claim 9, wherein generating the fourth image file comprises:
performing a band pass swap to replace the first subset of frequencies in the second image file with the second subset of frequencies.

11. The method of claim 10, wherein performing the band pass swap comprises:
generating a selection band mask based on the first subset of frequencies;
applying a Gaussian blur to the selection band mask; and
multiplying, after applying the Gaussian blur to the selection band mask, the selection band mask with the second subset of frequencies.

12. The method of claim 11, wherein generating the selection band mask comprises:
generating the selection band mask such that the selection band mask has a quarter circle with an origin at coordinates (0,0), such that the selection band mask has a radius that is based on the first subset of frequencies, and such that the quarter circle has a particular border thickness.

13. The method of claim 8, further comprising transforming first data of the second image file to the first frequency domain representation of the second image file by applying a discrete cosine transformation to the second image file to transform the first data of the second image file to the first frequency domain representation of the second image file.

14. The method of claim 13, wherein applying the discrete cosine transformation to the second image file comprises:
applying the discrete cosine transformation to the second image file to generate an M×N matrix that represents a frequency distribution of the second image file.

15. The method of claim 14, wherein transforming the first data of the second image file to the first frequency domain representation of the second image file comprises:
identifying the first subset of frequencies based on the M×N matrix that represents the frequency distribution of the second image file.

16. A non-transitory computer-readable medium storing a set of instructions, the set of instructions comprising:
one or more instructions that, when executed by one or more processors of a computer vision platform, cause the computer vision platform to:
transform first data of a first image file to a first frequency domain representation of the first image file;
identify, based on the first frequency domain representation, a first subset of frequencies and a second subset of frequencies for the first image file;
transform second data of a second image file to a second frequency domain representation of the second image file;
identify, based on the second frequency domain representation, a third subset of frequencies and a fourth subset of frequencies for the second image file;
generate a third image file that corresponds to the first image file in which at least a portion of the first subset of frequencies is replaced with at least a portion of the third subset of frequencies, and at least a portion of the second subset of frequencies is replaced with at least a portion of the fourth subset of frequencies;
store the third image file in a set of training image files; and
train a machine learning model using the second set of training image files.

17. The non-transitory computer-readable medium of claim 16, wherein the one or more instructions, that cause the computer vision platform to transform the first data of the first image file to the first frequency domain representation of the first image file, cause the computer vision platform to:
transform grayscale data of the first image file to a grayscale frequency domain representation of the first image file.

18. The non-transitory computer-readable medium of claim 16, wherein the one or more instructions, that cause the computer vision platform to transform the first data of the first image file to the first frequency domain representation of the first image file, cause the computer vision platform to:
transform red channel data of the first image file to a red channel frequency domain representation of the first image file;
transform green channel data of the first image file to a green channel frequency domain representation of the first image file; and
transform blue channel data of the first image file to a blue channel frequency domain representation of the first image file.

19. The non-transitory computer-readable medium of claim 16, wherein the first subset of frequencies being replaced with the third subset of frequencies, and the second subset of frequencies being replaced with the fourth subset of frequencies, results in mixing of texture properties of the first image file and texture properties the second image file in the third image file.

20. The non-transitory computer-readable medium of claim 16, wherein a fifth subset of frequencies of the first image file represents shapes and edges included in the first image file.

\* \* \* \* \*